(12) United States Patent
Vassilovski et al.

(10) Patent No.: US 12,302,193 B2
(45) Date of Patent: May 13, 2025

(54) USER EQUIPMENT (UE) BASED RELATIVE POSITION

(71) Applicant: QUALCOMM Incorporated, San Diego, CA (US)

(72) Inventors: Dan Vassilovski, Del Mar, CA (US); Sony Akkarakaran, Poway, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 17/696,623

(22) Filed: Mar. 16, 2022

(65) Prior Publication Data

US 2023/0300567 A1    Sep. 21, 2023

(51) Int. Cl.
*H04W 4/02*    (2018.01)
*H04W 4/40*    (2018.01)

(52) U.S. Cl.
CPC .............. *H04W 4/023* (2013.01); *H04W 4/40* (2018.02)

(58) Field of Classification Search
CPC ............................... H04W 4/023; H04W 60/00
See application file for complete search history.

(56) References Cited

U.S. PATENT DOCUMENTS

| | | | |
|---|---|---|---|
| 10,074,280 B2 | 9/2018 | Bai et al. | |
| 10,202,115 B2 | 2/2019 | Stenneth | |
| 2017/0287332 A1 | 10/2017 | Ranninger Hernandez et al. | |
| 2021/0385619 A1 | 12/2021 | Balasubramanian et al. | |
| 2022/0078581 A1 | 3/2022 | Choi et al. | |
| 2022/0303721 A1* | 9/2022 | Kassir | G01S 5/0072 |
| 2023/0222681 A1* | 7/2023 | Lee | G01S 19/14 348/143 |

FOREIGN PATENT DOCUMENTS

| | | |
|---|---|---|
| EP | 3783924 | 2/2021 |
| WO | WO 2021141770 | 7/2021 |
| WO | WO-2021194590 A1 | 9/2021 |
| WO | WO-2021226059 A1 | 11/2021 |

OTHER PUBLICATIONS

International Search Report and Written Opinion PCT/US2023/061949—ISA/EPO—May 10, 2023.

* cited by examiner

*Primary Examiner* — Kevin Kim
(74) *Attorney, Agent, or Firm* — Weaver Austin Villeneuve & Sampson LLP/QUALCOMM

(57) ABSTRACT

A user equipment (UE), for example, used with a Vulnerable Road User, determines a relative position of the UE and sends a report of the relative position to one or more vehicle On-Board Units (OBUs), wherein the report further includes an identification of the one or more reference points. The relative position may be with respect to one or more reference points, which may be stationary or moving. The relative position may be determined and reported based on identifiers for the one or more reference points and distance or distance vectors to each of the one or more reference points. The relative position may be determined based on data from one or more one board sensors, such as radar, lidar, ultrasound, or camera, as well as with wireless transceivers. The relative position may additionally include a heading and a placement with respect to one or more street elements.

30 Claims, 5 Drawing Sheets

USER EQUIPMENT (UE) BASED RELATIVE POSITION

BACKGROUND

Background Field

The subject matter disclosed herein relates to wireless communications systems, and more particularly to methods and apparatuses for location determination of user equipment (UE) within a communication system.

Relevant Background

Vehicular communication systems are areas of active interest in the communications industry for providing information useful in transportation. Vehicular communication systems, for example, include nodes, such as roadside units (RSUs) and the vehicles themselves, that wirelessly transmit traffic related information and are being developed as part of intelligent transportation systems (ITS). For example, vehicular communication systems include direct communication systems, such as dedicated short-range communication (DSRC), cellular Vehicle-to-Everything (C-V2X) communication, and 5G New Radio (NR) communications.

User equipment (UE), e.g., wireless devices such as mobile communication devices, mobile phones, smart phones, etc., may be present in a traffic space. In some cases, UEs may be associated with a Vulnerable Road User (VRU), such as those in the road space that are unprotected by an outside shield, such as pedestrians, bicyclists and motorcyclists, that are at an increased risk of injury or death in any collision with a vehicle. Identification of the position of a UE (and in particular a UE associated with a VRU) within a vehicular communication system is, thus, desirable so that vehicles may determine if maneuvers should be taken to protect or avoid the UE.

SUMMARY

A user equipment (UE), for example, used with a Vulnerable Road User, determines a relative position of the UE and sends a report of the relative position to one or more vehicle On-Board Units (OBUs), wherein the report further includes an identification of the one or more reference points. The relative position may be with respect to one or more reference points, which may be stationary or moving. The relative position may be determined and reported based on identifiers for the one or more reference points and distance or distance vectors to each of the one or more reference points. The relative position may be determined based on data from one or more one board sensors, such as radar, lidar, ultrasound, or camera, as well as with wireless transceivers. The relative position may additionally include a heading and a placement with respect to one or more street elements.

In one implementation, a method performed by a user equipment (UE) for performing positioning includes determining a relative position of the UE with respect to one or more reference points; and sending a report of the relative position to one or more vehicle On-Board Units (OBUs) in a wireless network, wherein the report further comprises an identification of the one or more reference points.

In one implementation, a user equipment (UE) configured for performing positioning includes a wireless transceiver configured to wirelessly communicate with network entities; one or more sensors, at least one memory; and at least one processor coupled to the wireless transceiver, the one or more sensors, and the at least one memory, the at least one processor configured to: determine a relative position of the UE with respect to one or more reference points; and send, via the wireless transceiver, a report of the relative position to one or more vehicle On-Board Units (OBUs) in a wireless network, wherein the report further comprises an identification of the one or more reference points.

In one implementation, a user equipment (UE) configured for performing positioning includes means for determining a relative position of the UE with respect to one or more reference points; and means for sending a report of the relative position to one or more OBUs in a wireless network, wherein the report further comprises an identification of the one or more reference points.

In one implementation, a non-transitory storage medium including program code stored thereon, the program code is operable to configure at least one processor in a user equipment (UE) for performing positioning, the program code comprising instructions to: determine a relative position of the UE with respect to one or more reference points; and send a report of the relative position to one or more vehicle On-Board Units (OBUs) in a wireless network, wherein the report further comprises an identification of the one or more reference points.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
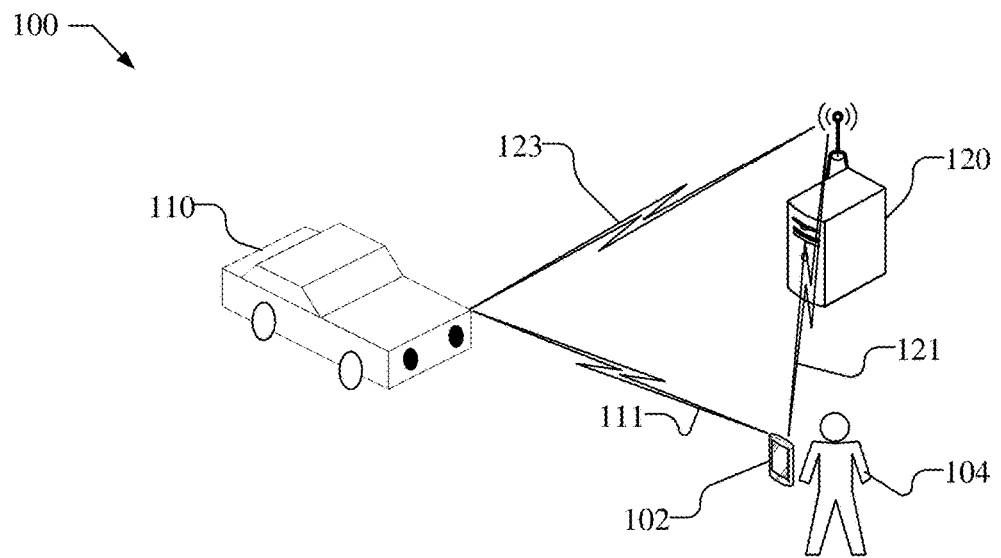
FIG. 1 illustrates a wireless communication system in which a user device is in wireless communications with other network entities.

Vehicular communication systems, such as Vehicle to Everything (V2X), may be used, for example, for safety related applications, such as safety warnings, traffic congestions (e.g., automated traffic control), and coordinated or automated vehicle maneuvering. Application layer messages and information elements (IEs) to support safety related applications are being defined by various standards development organizations. For example, Society of Automotive Engineers (SAE) is preparing work item J3186 Maneuver Sharing and Coordinating Service and J2945/6 Performance Requirements for Cooperative Adaptive Cruise Control and Platooning. In China, Baidu has initiated a Phase 3 message definition effort for coordinated driving. Such messages are prerequisites for intelligent transportation systems (ITS), for example, for coordinated or automated vehicle maneuvering and traffic control.

One safety aspect considered for vehicular communication systems is the protection of VRUs. For example, a UE that is associated with a VRU can determine its absolute position using a Satellite Positioning System (SPS), such as a Global Navigation Satellite System (GNSS), e.g., Global Positioning System (GPS), Global Navigation Satellite System (GLONASS), BeiDou Navigation Satellite System (BDS), Quasi-Zenith Satellite System (QZSS), Galileo, etc., or using cellular based positioning techniques. The UE may provide its position data to network entities over a cellular connection, e.g., via the network through a base station (via a Uu interface) or directly via a sidelink connection (via a PC5 interface). Application-layer messages have been defined by Standards Development Organizations (SDOs) for UEs to transmit location, motion state, path history and/or path prediction information to other cellular Vehicle-to-Everything (CV2X) devices, such as vehicles and roadside units (RSUs), wherein the location information may include an accuracy metric. The UE-reported position information enables RSUs, vehicles and infrastructure entities to determine if maneuvers should be taken to protect or avoid the UE.

Current standards considered for defining the reporting of position information for VRU UEs specify that location information is delivered as an absolute position in a periodic manner through transmission of an application-layer message, such as a Personal Safety Message (PSM). Vehicle maneuvers to avoid a VRU, however, are based on the relative position of the VRU with respect to the vehicle, or the VRU relative position with respect to a road feature (e.g., a VRU in a crosswalk). A receiver of VRU position information (e.g., a network entity, RSU, or a communication device mounted on a vehicle, e.g., On-Board Unit (OBU)) accordingly needs to analyze the reported VRU absolute position to determine the VRU relative position and determine if action to avoid the VRU is required. Reporting an absolute position, thus, places a burden on the receiver to perform this analysis, requires regular, periodic position updates from the VRU, and is subject to the accuracy limitations of absolute position techniques, such as GNSS.

Accordingly, in some aspects of the disclosure herein, a UE may determine and report a relative position of the UE with respect to one or more reference points. Reporting a relative position of the UE, on the other hand, may exploit on-board sensors of the UE such as radar, lidar, ultrasonic and cameras to provide a more accurate distance measurement with respect to objects or known road features/landmarks. For example, the relative position may be determined based on data from one or more of radar, lidar, ultrasonic positioning, or camera. In some implementations, the relative position may be additionally or alternatively determined based on wireless signals, such as sidelink positioning, in which a range and/or angle with respect to a wireless transmitter may be determined. The UE may send a report that includes the relative position of the UE to one or more vehicle On-Board Units (OBUs) in a wireless network, e.g., directly or via one or more intervening network entities. Reporting a relative position of the UE can provide a more accurate distance measurement with respect to objects or known road features/landmarks. In some implementations, the UE may send a report that includes the relative position of the UE to other UEs. The report may include, e.g., an identification of the one or more reference points and a relative position, e.g., a distance or distance vector, to each of the one or more reference points. The one or more reference points may be stationary, e.g., fixed or unmoving, or moving. In some implementations, the relative position may further include a heading of the UE, e.g., a heading with respect to North, and/or may include the placement of UE, e.g., where in the street environment the UE is located, such as one or more street (design) elements in the environment of and/or accessible by the VRU, e.g., a sidewalk, a curb or curb extension, a bike lane, a (raised) crosswalk, a corner, a crossing or intersection, a truck apron or pillow, a bus bulb, a crossing island, a traffic circle, a road or lane, etc.

FIG. 1 illustrates a V2X wireless communication system 100 in which V2X services operate using (direct) wireless communications between V2X entities, including UE 102. The UE 102 is illustrated as being associated with VRU (user) 104, and may sometimes be referred to herein as VRU UE 102 or simply as UE 102. In some implementations, the UE may be associated with, e.g., carried or held by, a VRU. Examples of UE associated with a VRU may be handheld device, such as mobile communication devices, mobile phones, smart phones, etc., body-worn or head-mounted device, such as smart glasses, smart watches, etc., or a combination thereof such a device in a personal area network (PAN). A UE may be determined to be associated with a VRU based on the type of the UE, e.g., a smart watch or smart glasses, based on current location and/or motion information, e.g., being located in an outside environment as opposed to inside a building, not being associated with a motorized vehicle such as a car or truck, not being associated with a home network, and the like. An association with a motorized vehicle or a home network may, for instance, be determined in terms of a wireless pairing of the UE with an OBU of the vehicle or a network unit of the home network. It should be understood, however, that the present disclosure is not limited to only UEs that are associated with VRUs, and in some implementations may be used with other types of UEs, including UEs associated with vehicles, e.g., OBUs. As illustrated, the UE 102 may directly communicate with various other network entities wirelessly, such as a vehicle UE (OBU) 110 (illustrated as a car) via a Vehicle-to-Pedestrian (V2P) communication link 111 or a roadside unit (RSU) 120 via a Vehicle-to-Infrastructure (V2I) communication link 121. FIG. 1 illustrates the VRU 104 as a pedestrian, but it should be understood that the VRU 104 may be a cyclist, motorcyclist, or any other road space user that may be unprotected by an outside shield and is at increased risk of injury or death in any collision with a vehicle.

A roadside unit (RSU) is a stationary infrastructure entity supporting V2X applications that can exchange messages with other entities supporting V2X applications. The VRU UE 102 may be in wireless communication with the OBU 110 via the RSU 120, via V2I communication link 121 and V2I communication link 123. The wireless communication, for example, may be over, e.g., Proximity-based Services (ProSe) Direction Communication (PC5) reference point as defined by the 3rd Generation Partnership Project (3GPP) body of standards, such as in Technical Specification (TS) 23.303, and may use wireless communications under IEEE 1609, Wireless Access in Vehicular Environments (WAVE), Intelligent Transport Systems (ITS), dedicated short range communications (DSRC), cellular Vehicle-to-Everything (C-V2X), and IEEE 802.11p, on the ITS band of 5.9 GHz, or other wireless connections directly between entities.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases, such as lane changes, speed changes, overtaking speeds, etc. As discussed, herein, one or more messages may be transmitted in the V2X wireless communication system 100 to support the reporting of the relative position of the VRU UE 102 to one or more network entities, including the OBU 110 and RSU 120.

Figure 2:
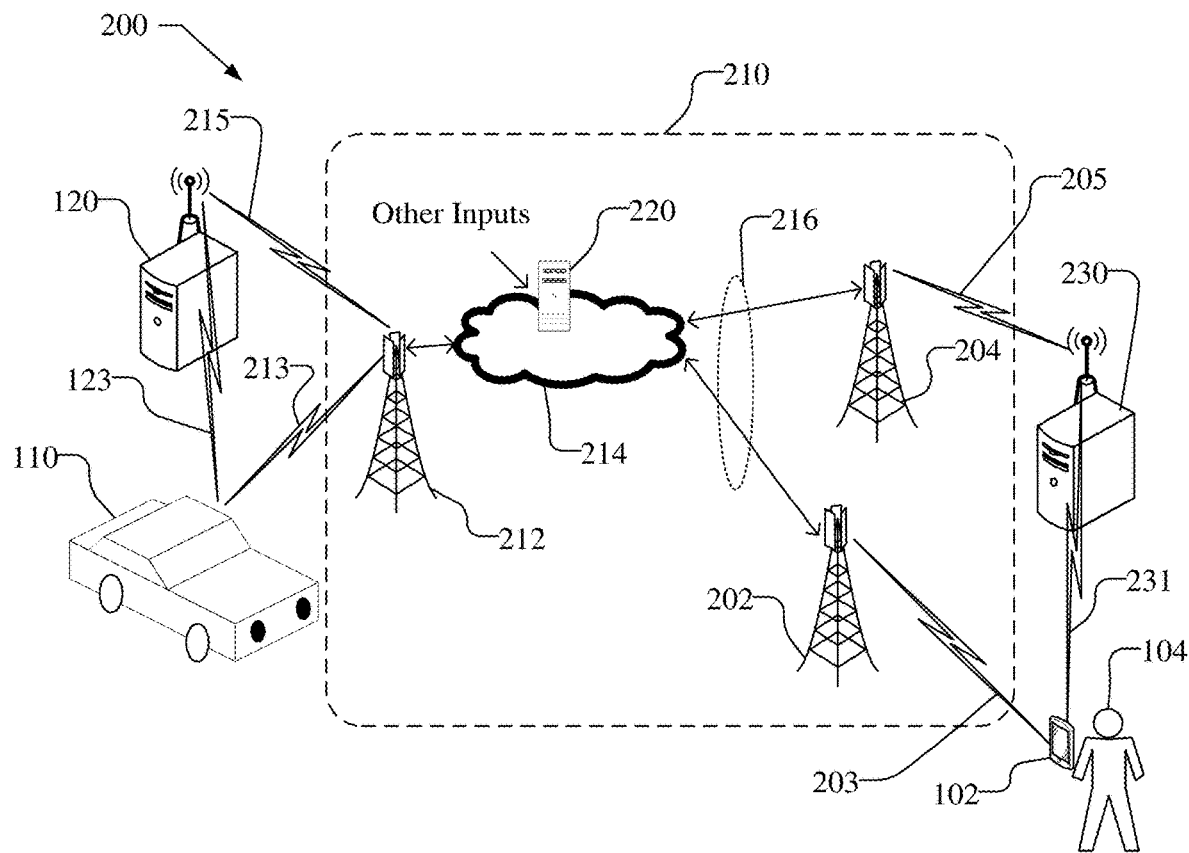
FIG. 2 illustrates another wireless communication system in which a user device is in wireless communications with other network entities.

FIG. 2 illustrates a Vehicle-to-Network (V2N) wireless communication system 200 in which V2X services operate using a wireless network between entities, such as Wireless Wide Area Networks (WWAN). For example, entities may communicate via the Long Term Evolution (LTE) network, where the radio interface between the user equipment (UE) and the eNodeB is referred to as LTE-Uu, or other appropriate wireless networks, such as "3G," "4G," or "5G" networks. As illustrated, the VRU UE 102 may wirelessly communicate with network entities in the wireless communication system 200, such as the OBU 110, RSU 120, through the network infrastructure 210, which for the sake of example, will be referred to as an LTE network, but may be a 5G NR network or other type of network. As illustrated, the VRU UE 102 may wirelessly communicate with the network infrastructure 210, e.g., a base station 202, referred to as an eNodeB in the LTE network infrastructure 210 (or a gNodeB in a 5G NR network infrastructure), via a Uu interface 203. As illustrated, in some implementations, the VRU UE 102 may directly communicate with an RSU 230 via communication link 231, which interfaces with a base station 204 via a Uu interface 205.

The base station 202 may communicate with other base stations, e.g., base station 212 through the IP layer 214 and network 216, such as an Evolved Multimedia Broadcast Multicast Services (eMBMS)/Single Cell Point To Multipoint (SC-PTM) network. The server 220 may be part of or connected to the IP layer 214, as illustrated, or may be external to the IP layer 214 and the network infrastructure 210. The base station 212 may wirelessly communicate with the OBU 110 directly or through other V2X entities, such as RSU 120 via Uu interfaces 213 or 215 and V2I link 123. The V2N communication using the "Uu" interface may be used to exchange messages using, e.g., C-V2X, 5G NR communications, etc. The information exchange may be similar to that discussed above, including messages related to support the reporting of the relative position of the VRU UE 102 to one or more network entities, but the information exchange may be over a greater distance than the direct communications shown in FIG. 1.

The server 220 illustrated in network infrastructure 210 may receive and route relative position information from the VRU UE 102 and/or the OBU 110 and/or other entities. The server 220 may additionally provide information to the VRU UE 102 for reference points, such as fixed reference points, which may be used to determine the relative position of the VRU UE 102. The server 220, for example, may provide the VRU UE 102 with road, topographic, landmark information (roads, intersections, curbs, sidewalks), including map information/type being used (e.g., map version, resolution, type), including identifiers for reference points. The server 220 may provide the VRU UE 102 with position information for the reference points, such as the absolute positions of stationary reference points. In some implementations, the position of the reference point may be used as the reference point identifier. In some implementations, the VRU UE 102 may determine the position information for stationary reference points based on, e.g., the road, topographic, landmark information (map information) provided to the VRU UE 102. The server 220 may additionally route information, e.g., reference point identifier and/or position information, to the VRU UE 102 for moving or stationary reference points, or the moving or stationary reference points may provide such information to the VRU UE 102 directly or via another intervening entity, such as RSU 120. The server 220 may further coordinate positioning by the VRU UE 102, including requesting and receiving capability information from the VRU UE 102, such as whether the VRU UE 102 is able to determine and report a relative position, an absolute position, or both, and provide one or more messages to configure the VRU UE 102 to obtain and report a relative position, an absolute position, or both. In some implementations, the functions of server 220 may be distributed amongst multiple servers or other entities within the network infrastructure 210 or external to the network infrastructure 210, and in some implementations, various entities within the wireless communication system 200 (or wireless communication system 100 shown in FIG. 1) such as RSU 120 and OBU 110 may perform one or more functions in place of server 220.

Figure 3:
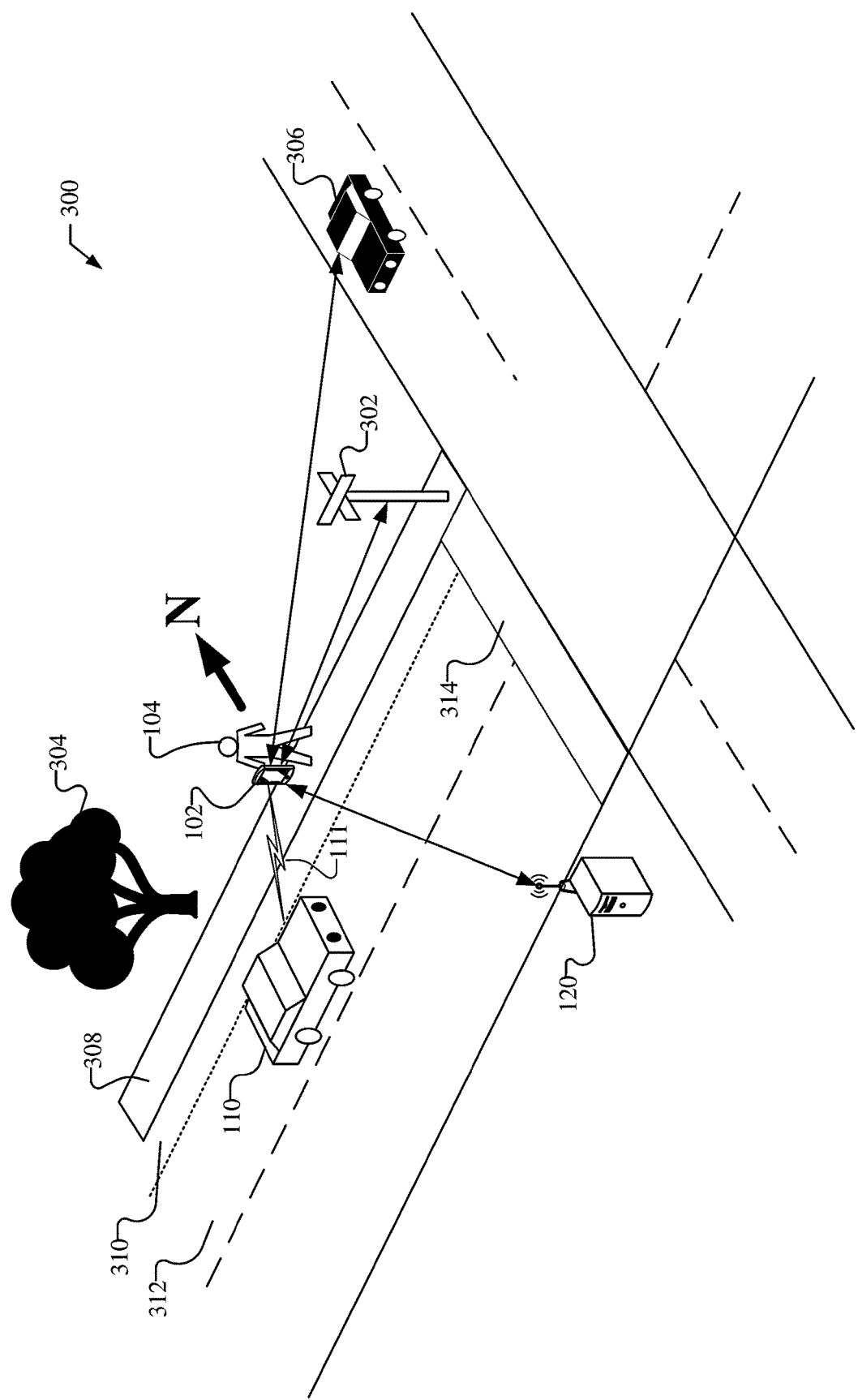
FIG. 3 illustrates an environment in which a UE determines its relative position with respect to one or more reference points and reports the relative position to one or more network entities in the wireless network.

FIG. 3 illustrates an environment 300 in which the VRU UE 102 determines its relative position with respect to one or more reference points and reports the relative position to one or more network entities in the wireless network, illustrated as OBU 110.

The VRU UE 102 may determine its relative position with respect to one or more reference points, which may include stationary reference points or moving reference points. A stationary reference point may include a stationary vehicle such as a parked vehicle. Additionally or alternatively, a stationary reference point may include a fixed (in space) reference point, for example, the RSU 120 or street sign 302, and may include other fixed landmarks, such as tree 304, buildings (not shown), the intersection of the streets, etc. A moving reference point, for example, may include vehicle 306, which may be a non-V2X capable vehicle, or may include other moving entities, such as other VRUs. In one implementation, the relative position with respect to the one or more reference points need not include the relative position with respect to the OBU 110 itself.

The VRU UE 102, for example, may receive information for one or more stationary reference points, such as the RSU 120 or street sign 302, etc. The information, for example, may be obtained from one or more entities in the wireless network, such as the server 220 shown in FIG. 2 or the OBU 110 or RSU 120. The information may be used to assist in the determination of the relative position of the VRU UE 102. For example, the information may include identifiers of stationary or fixed reference points that may be used by the VRU UE 102 for determining a relative position. The information may be provisioned or downloaded by the VRU UE 102 and may include, e.g., road, topographic, landmark information (roads, intersections, curbs, sidewalks, etc.), and may include map information and/or type being used (e.g., map version, resolution, type). The VRU UE 102 may additionally or alternatively receive information related to moving reference points, such as vehicle 306, including an identifier for the moving reference point. The information related to moving reference points, for example, may be received from one or more entities in the wireless network, such as the OBU 110 or RSU 120, or in some implementations from the server 220, e.g., via a Basic Safety Message (BSM) or other application-layer message.

The VRU UE 102 may determine its relative position with respect to one or more reference points, e.g., based on one or more on-board sensors of the VRU UE. For example, the VRU UE 102 may determine a distance, e.g., range or distance vector, from a reference point, such as the street sign 302, using one or more of a camera, radar, lidar, ultrasonic sensor, etc. For example, the VRU UE 102 may identify a reference point based on a known approximate position and orientation of the VRU UE 102, which may be determined using positioning techniques including SPS, cellular based, dead reckoning, etc., using SPS receiver data, cellular transceiver data, accelerometer data, gyroscopic data, magnetometer data, wheel sensor data (e.g., if the VRU UE 102 is a cycle), etc. Based on the approximate position and orientation of the VRU UE 102, one or more reference points may be identified from the provisioned or downloaded information related to reference points, including map data. The VRU UE 102 may detect one or more reference points using object recognition, e.g., using camera data, and/or based on the position and orientation from map data and the VRU UE 102 approximate position and orientation. The VRU UE 102 may use on-board sensors, such as camera, radar, lidar, and/or ultrasonic sensor to determine the distance to the identified one or more reference points. The VRU UE 102 may additionally determine the accuracy of the distance measurement to each of the one or more reference points.

In some implementations, the VRU UE 102 may determine a distance, e.g., range or distance vector, to a wireless transmitter that servers as a reference point, e.g., using wireless positioning techniques, such as round trip time (RTT), or Reference Signal Received Power (RSRP). The wireless positioning techniques, for example, may use a sidelink connection to an entity in the V2X wireless network or in a separate wireless network, or use a Uu connection with a base station in a cellular network. For example, the VRU UE 102 may determine the distance to the RSU 120 based on RTT using the V2I communication link 121 (shown in FIG. 1). In some implementations, the reference point may be a base station, such as base station 202 shown in FIG. 2, that may transmit positioning resources in beams. The VRU UE 102 may determine the distance to the base station, e.g., using RTT or RSRP, as well as the beam identifier of the received beam, which may be used to determine a relative orientation of the VRU UE with respect to the base station, e.g., Angle of Arrival (AoA). In some implementations, the VRU UE 102 may determine a relative position with respect to multiple reference points, e.g., multiple base stations, e.g., in a Reference Signal Time Difference (RSTD) measurements, which is a measure of the relative time difference in received signals from two base stations, and thus the distance may be in the form of a hyperbola from multiple reference points. The VRU UE 102 may additionally determine the accuracy of the wireless distance (vector) measurement to each of the one or more reference points.

The relative position of the VRU UE 102 with respect to the one or more reference points, e.g., the street sign 302, RSU 120, and the vehicle 306, may thus be determined as a distance, e.g., a range or distance vector, to each of the reference points, and the VRU UE 102 may send to one or more OBUs in the wireless network, such as OBU 110, shown in FIG. 3, a report of the relative position of the VRU UE 102. The report may further include an identification of each of the reference points. The report sent to the OBU 110 may include additional information, such as an accuracy of the distance to each reference point, a beam identifier, an identification of the type of measurement or sensor used to determine the distance, etc. Each OBU may be configured with the same reference point information as the VRU UE 102. The OBU is further capable of determining its absolute position and/or its relative position with respect to the one or more reference points identified by the VRU UE 102. Accordingly, the OBU may determine its relative position with respect to the VRU UE 102 based on the VRU UE 102's relative position to one or more reference points and the OBU's absolute position and/or relative position with respect to the one or more reference points identified by the VRU UE 102. The VRU UE 102 may send the report with the relative position to OBU 110 directly, e.g., via communication link 111, or through one or more intermediary entities, such as RSU 120 or entities in the wireless communication system 200 shown in FIG. 2. The VRU UE 102, for example, may report its relative position via Uu. Thus, the VRU UE 102 may report its relative position via at least one of Uu Radio Resource Control (RRC), PC5-RRC, PC5-S (sidelink) and application-layer signaling mechanisms.

In some implementations, the VRU UE 102 may determine additional relative position information, which can be reported to the OBU 110. For example, the VRU UE 102 may determine its placement, e.g., its location with respect to the road space or traffic area. In other words, the VRU UE 102 may determine whether it is located in one or more street (design) elements, such as crosswalks, sidewalks, etc., that are generally accessible to the VRU. For example, the VRU UE 102 may determine if the VRU UE 102 is located on the sidewalk 308, in a bike lane 310, in the road 312, in a crosswalk 314, etc., e.g., based on sensor information, such as SPS receiver data, cellular transceiver data, accelerometer data, gyroscopic data, magnetometer data, etc. Additionally or alternatively, the (relative) location may be determined using image processing based on one or more images captured by a camera of the VRU UE 102. The VRU UE 102 may determine a placement, such as left or north sidewalk 308.

In another example, the VRU UE 102 may determine its heading, e.g., its direction of travel with respect to a geographic coordinate system, such as WGS84 North 316, which may be determined, e.g., using positioning techniques including SPS, cellular based, dead reckoning, etc., using SPS receiver data, cellular transceiver data, accelerometer data, gyroscopic data, magnetometer data, etc. The heading of the VRU UE 102 may be based on sampling position and/or acceleration data using respective sensors and/or positioning techniques. Filtering, averaging and/or further processing of the sensor and/or positioning data may be performed to separate a heading of the VRU (carrying, holding, or otherwise being physically associated with the VRU UE) from movements of the VRU UE relative to the VRU, e.g., by movement of a hand holding the VRU UE. In the present disclosure, the relative position information may include a momentary or time (window)-averaged heading of the VRU associated with the VRU UE 102. The heading may be relative to one or more reference points, such as the vehicle associated with the OBU 110, and/or relative to one or more street (design) elements, such as a pedestrian crossing or a curb of a street. In addition to the heading, velocity information may be included in the relative position information.

The report sent by the VRU UE 102 to the OBU 110 may, thus, include a relative position, e.g., distances or distance vectors to each of the one or more reference points, and optionally at least one of identifiers for one or more reference points, (relative) location in a traffic area/environment, heading or velocity.

In some implementations, the VRU UE 102 may also determine an absolute position, e.g., using SPS positioning techniques and/or cellular based positioning techniques. The report sent by the VRU UE 102 to the OBU 110 may include the absolute position of the VRU UE 102 along with the relative position.

In some implementations, the VRU UE 102 may communicate with one or more network entities, e.g., server 220, OBU 110, RSU 120, etc. and provide its positioning capability to determine and report a relative position, an absolute position, or a combination thereof. The VRU UE 102 may receive a message from the one or more network entities with an indication of the type of position to be determined and reported to configure the VRU UE 102 to report a relative position, an absolute position, or a combination thereof.

Thus, the VRU UE 102 may send a message to one or more network entities via at least one of Uu Radio Resource Control (RRC), PC5-RRC, PC5-S(Signaling) and application-layer signaling mechanisms for the VRU UE 102 to report its location as a relative position with respect to other sensed objects (stationary, fixed and/or moving reference points), where the sensors may include at least one of radar, lidar, camera, ultrasonic, or wireless positioning. The VRU UE 102 may inform a network entity (via Uu or PC5 communications) of the positioning capability of the VRU UE 102, e.g., to determine and report absolute and/or relative position, and for the network entity to direct the VRU UE 102 how and when position information should be reported. The reporting configuration may be provided by the network entity over common or dedicated signaling, through application-layer signaling or may be pre-configured in the VRU UE 102. Enabling the VRU UE 102 to provide a relative position, as opposed to an absolute position, allows the VRU UE 102 position reporting to occur when action is required on the part of other road users, offloads the receiver or network computational burden to determine the relative position, and allows position information to be transmitted as-needed, reducing over-the-air usage and congestion.

The VRU UE 102 may provide its position reporting capability in one or more information elements (IEs) provided to a network entity such as a base station. The VRU UE 102 position reporting capability may be specified as an enumerated list in an IE that, as an example, may be referred to as "UE-LocationCapability," e.g., as illustrated in Table 1 below. The definition in Table 1 is based on a fragment of Abstract Syntax Notation One (ASN.1).

TABLE 1

```
UE-LocationCapability ::= SEQUENCE {
    ue-LocationType        UE-LocationType,
    ue-LocationTech        UE-LocationTech
}
UE-LocationType           ::= ENUMERATED {Absolute,
                              Relative}
UE-LocationTech           ::= ENUMERATED {GNSS-gps,
    GNSS-glonass, GNSS-bds, GNSS-qzss, GNSS-galileo, GNSS-bds,
    SLP, radar, lidar, ultrasonic, camera, spare1, spare2, spare3, spare4,
    spare5}
}
```

TABLE 1-continued

UE-LocationCapability field description

UE-LocationType
Specifies UE capability for absolute or relative position determination
UE-LocationTech
Specifies UE location technology. Value GNSS-gps means UE supports GPS, value GNSS-glonass means UE supports GLONASS, value GNSS-bds means UE supports BDS, value GNSS-qzss means UE supports QZSS, value GNSS-galileo means UE supports Galileo, value SLP means the UE supports Sidelink Positioning, value radar means the UE supports radar-based positioning, value lidar means the UE supports lidar-based positioning, value ultrasonic means the UE supports ultrasound-based positioning, value camera means the UE supports camera-based positioning.

In addition to GNSS-based technologies, a UE is enabled to indicate its support for sensor-based ranging/positioning technologies (Sidelink Positioning, Radar, Lidar, Ultrasonic, Camera). A UE may transmit its position reporting capability information as: Uu RRC signaling, e.g., using UECapabilityInformation and/or SidelinkUEInformationNR; PC5-RRC, e.g., using UECapabilityInformationSidelink and/or RRCReconfigurationSidelink; PC5 Signaling, e.g., using a newly defined PC5-S message; or application-layer signaling, e.g., using an application-layer message (unicast, groupcast, broadcast). Using a groupcast or broadcast application-layer message may reduce over-the-air usage and congestion, e.g., in dense urban environments.

By way of example, the UE position capability may be sent to a network entity using Uu RRC signaling, such as with an existing NR Uu RRC message (e.g., SidelinkUEInformationNR) defined by 3GPP.

Figure 4:
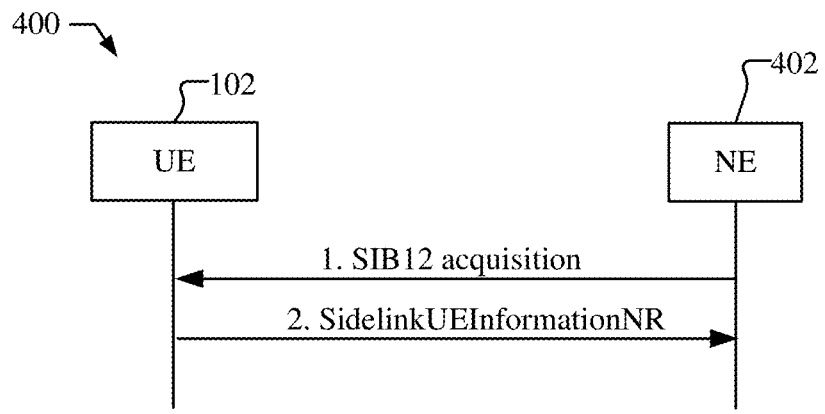
FIG. 4 illustrates a signal flow for a UE to send position capability information to a network entity.

FIG. 4, by way of example, illustrates a signal flow 400 of a VRU UE 102 sending position capability information to a network entity (NE) 402. The NE 402, for example, may be the server 220 or the base station 202 shown in FIG. 2 or another network entity, including the OBU 110 or RSU 120.

As illustrated in stage 1 of FIG. 4, the VRU UE 102 may receive system information, such system information block SIB12 acquisition, from the NE 402. The SIB12 may be a System Information Block message sent by a cellular network (Uu) per 3GPP standards to provide configuration information to a UE. The SIB12 in FIG. 4 may be used to provide the VRU UE 102 with a UE configuration for Sidelink communication.

As illustrated in stage 2 of FIG. 4, the VRU UE 102 may send to the NE 402 an (NR) Uu RRC message such as a SidelinkUEInformationNR message, which includes the position reporting capability of the VRU UE 102.

Thus, the VRU UE 102 may inform the network entity of its positioning capability using, e.g., UE-LocationCapability incorporated into SidelinkUEInformationNR message, as illustrated in Table 2 below. The definition in Table 2 is based on a fragment of Abstract Syntax Notation One (ASN.1).

TABLE 2

```
-- ASN1START
-- TAG-SIDELINKUEINFORMATIONNR-START
SidelinkUEInformationNR-r16 ::=        SEQUENCE {
    criticalExtensions                 CHOICE {
        sidelinkUEInformationNR-r16        SidelinkUEInformationNR-r16-IEs,
        criticalExtensionsFuture           SEQUENCE { }
    }
}
SidelinkUEInformationNR-r16-IEs ::=    SEQUENCE {
    sl-RxInterestedFreqList-r16            SL-InterestedFreqList-r16     OPTIONAL,
    sl-TxResourceReqList-r16                   OPTIONAL,
    sl-FailureList-r16                         OPTIONAL,
    lateNonCriticalExtension               OCTET STRING                  OPTIONAL,
    nonCriticalExtension                   SEQUENCE { }                  OPTIONAL,
    ue-LocationCapability                      UE-LocationCapability     OPTIONAL
}
...
*** IEs Omitted ***
-- TAG-SIDELINKUEINFORMATIONNR-STOP
-- ASN1STOP
```

In another implementation, the UE position capability may be sent to a network entity with an existing NR Uu RRC message (e.g., UECapabilityInformation).

Figure 5:
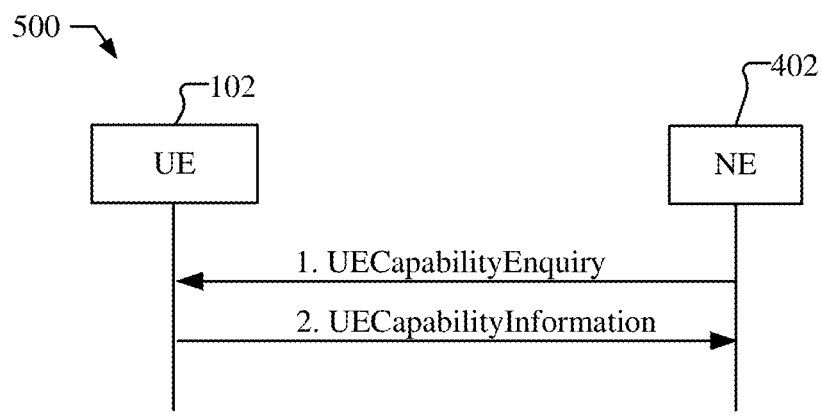
FIG. 5 illustrates another signal flow for a UE to send position capability information to a network entity.

FIG. 5, by way of example, illustrates a signal flow 500 of a VRU UE 102 sending position capability information to a network entity (NE) 402. The NE 402, for example, may be the server 220 or the base station 202 shown in FIG. 2 or another network entity, including the OBU 110 or RSU 120.

As illustrated in stage 1 of FIG. 5, the VRU UE 102 may receive from the NE 402 a UECapabilityEnquiry message requesting the VRU UE 102 to provide UE capability information.

As illustrated in stage 2 of FIG. 5, the VRU UE 102 may send to the NE 402 an (NR) Uu RRC message such as a UECapabilityInformation message, which includes the position reporting capability of the VRU UE 102.

Thus, the VRU UE 102 may inform the network entity of its positioning capability using, e.g., UE-LocationCapability incorporated into a UECapabilityInformation message, as illustrated in Table 3 below. The definition in Table 3 is based on a fragment of ASN.1.

TABLE 3

```
-- ASN1START
-- TAG-UECAPABILITYINFORMATION-START
UECapabilityInformation ::=        SEQUENCE {
    rrc-TransactionIdentifier          RRC-TransactionIdentifier,
    criticalExtensions                 CHOICE {
        ueCapability Information           UECapabilityInformation-IEs,
        criticalExtensionsFuture           SEQUENCE { }
    }
}
UECapabilityInformation-IEs ::=    SEQUENCE {
    ue-CapabilityRAT-ContainerList         OPTIONAL,
    ue-LocationCapability                  UE-LocationCapability
        OPTIONAL,
    lateNonCriticalExtension           OCTET STRING
```

TABLE 3-continued

```
        OPTIONAL,
    nonCriticalExtension               SEQUENCE{ }
        OPTIONAL
}
-- TAG-UECAPABILITYINFORMATION-STOP
-- ASN1STOP
```

In some implementations, the ue-LocationCapability IE may be added to the Uu UEInformationReponse message or to a newly defined RRC message.

In an implementation in which the VRU UE 102 position reporting capability is provided using PC5-RRC, the ue-LocationCapability IE may be added to a UECapabilityInformationSidelink message (for a UE responding to peer UE query), or to a newly defined PC5-RRC message.

In an implementation in which the VRU UE 102 position reporting capability is provided using PC5-S, the ue-LocationCapability IE may be added to a Direct Communication Request message, or to a newly defined PC5-S message.

In an implementation in which the VRU UE 102 position reporting capability is provided using the application layer, an application-layer message may be defined for inclusion of the ue-LocationCapability IE.

Additionally, the network entity may query the VRU UE 102 for its position reporting capabilities using Uu RRC signaling, such as with an existing NR Uu RRC message (e.g., UECapabilityEnquiry). For example, as illustrated in FIG. 5, the NE 402 may query the VRU UE 102 for its position reporting capabilities by including a request for the UE-LocationCapability in the UECapabilityEnquiry message sent in stage 1 of FIG. 5.

Thus, the network entity 402 may query the VRU UE 102 for its positioning capability using, e.g., UE-LocationCapability, using the UECapabilityEnquirySidelink message, as illustrated in Table 4 below. The definition in Table 4 is based on a fragment of ASN.1.

TABLE 4

```
-- ASN1START
-- TAG-UECAPABILITYENQUIRY-START
UECapabilityEnquirySidelink ::=   SEQUENCE {
    rrc-TransactionIdentifier         RRC-TransactionIdentifier,
    criticalExtensions                CHOICE {
        ueCapabilityEnquiry               UECapabilityEnquiry,
        criticalExtensionsFuture          SEQUENCE { }
    }
}
```

TABLE 4-continued

```
UECapabilityEnquiry-IEs ::=            SEQUENCE {
    ue-CapabilityRAT-RequestList           UE-CapabilityRAT-RequestList,
    lateNonCriticalExtension               OCTET STRING
                                           OPTIONAL,
    ue-CapabilityEnquiryExt                OCTET STRING (CONTAINING
                                           UECapabilityEnquiry-v1560-IEs)   OPTIONAL
}
UECapabilityEnquiry-v1560-IEs ::=      SEQUENCE {
    capability RequestFilterCommon             UE-CapabilityRequestFilterCommon
                                           OPTIONAL, -- Need N
    nonCriticalExtension                   UECapabilityEnquiry-v1610-IEs
                                           OPTIONAL
}
UECapabilityEnquiry-v1610-IEs ::=      SEQUENCE {
    rrc-SegAllowed-r16                     ENUMERATED {enabled}
                                           OPTIONAL, -- Need N
    nonCriticalExtension                   SEQUENCE { }
                                           OPTIONAL
    ue-LocationCapability                      UE-LocationCapability
}
}
-- TAG-UECAPABILITYENQUIRY-STOP
-- ASN1STOP
```

In some implementations, an IE may be added to the UEInformationRequest or to a newly defined RRC message.

In an implementation in which the VRU UE 102 position reporting capability is requested using PC5-RRC, the ue-LocationCapability IE may be added to a UECapabilityEnquirySidelink message (UE querying a peer UE), or to a newly defined PC5-RRC message.

In an implementation in which the VRU UE 102 position reporting capability is requested using PC5-S, the ue-LocationCapability IE may be added to the Direct Communication Response message, or to a newly defined PC5-S message.

In an implementation in which the VRU UE 102 position reporting capability is requested using the application layer, an application-layer message may be defined for inclusion of the ue-LocationCapability IE.

The VRU UE 102 may be configured to report its position by the network entity 402, e.g., in response to the VRU UE 102 position reporting capability provided to the network entity 402. For example, the VRU UE 102 position reporting may be configured cell-wide via common signaling. The network entity 402 may configure the VRU UE 102 position reporting as an absolute position, relative position, or an absolute position and relative position. As an example, the VRU-UE 102 position reporting may be configured using an IE that, as an example, may be referred to as "UE-LocationReporting," that may use a sidelink location reporting type that may be added to an existing SIB12 IE, such as SL-UE-SelectedConfig-r16, as illustrated in Table 5 below. The definition in Table 5 is based on a fragment of ASN.1.

TABLE 5

```
-- ASN1START
-- TAG-SL-UE-SELECTEDCONFIG-START
SL-UE-SelectedConfig-r16 ::=           SEQUENCE {
    sl-PSSCH-TxConfigList-r16              SL-PSSCH-TxConfigList-r16
        OPTIONAL, -- Need R
    sl-ProbResourceKeep-r16            ENUMERATED {v0, v0dot2, v0dot4, v0dot6, v0dot8}
        OPTIONAL, -- Need R
    sl-ReselectAfter-r16               ENUMERATED {n1, n2, n3, n4, n5, n6, n7, n8, n9}
        OPTIONAL, -- Need R
    sl-CBR-CommonTxConfigList-r16          SL-CBR-CommonTxConfigList-r16
        OPTIONAL, -- Need R
    ul-PrioritizationThres-r16         INTEGER (1..16)
        OPTIONAL, -- Need R
    sl-PrioritizationThres-r16         INTEGER (1..8)
        OPTIONAL, -- Need R
    UE-LocationReporting                   ENUMERATED {Absolute, Relative, Absolute
        and Relative}                      OPTIONAL, -- Need R
    ...
}
-- TAG-SL-UE-SELECTEDCONFIG-STOP
-- ASN1STOP
```

SIB12 field descriptions

UE-LocationReporting
This field indicates how position information is reported.

Other existing SIB12 IEs may be used for providing network direction on how a VRU UE is to report position information.

The SL-UE-SelectedConfig-r16, which incorporates the UE-LocationReporting IE as illustrated in Table 5, may be incorporated in the SL-ConfigCommonNR-16 IE in SIB12, as illustrated in Table 6 below. The definition in Table 6 is based on a fragment of ASN.1.

TABLE 6

```
-- ASN1START
-- TAG-SIB12-START
SIB12-r16 ::=                        SEQUENCE {
  segmentNumber-r16                    INTEGER (0..63),
  segmentType-r16                      ENUMERATED {notLastSegment, lastSegment},
  segmentContainer-r16                 OCTET STRING
}
SIB12-IEs-r16 ::=                    SEQUENCE {
  sl-ConfigCommonNR-r16                 SL-ConfigCommonNR-r16,
  lateNonCriticalExtension              OCTET STRING            OPTIONAL,
  ...
}
SL-ConfigCommonNR-r16 ::=              SEQUENCE {
  sl-FreqInfoList-r16                   SEQUENCE (SIZE (1..maxNrofFreqSL-r16)) OF
    SL-FreqConfigCommon-r16                                OPTIONAL,    -- Need R
  sl-UE-SelectedConfig-r16              SL-UE-SelectedConfig-r16
    OPTIONAL,   -- Need R
  sl-NR-AnchorCarrierFreqList-r16              SL-NR-AnchorCarrierFreqList-r16
    OPTIONAL,   -- Need R
  sl-EUTRA-AnchorCarrierFreqList-r16                        OPTIONAL,  --
    Need R
  sl-RadioBearerConfigList-r16          SEQUENCE (SIZE (1..maxNrofSLRB-r16))
    OF SL-RadioBearerConfig-r16                            OPTIONAL,   -- Need R
  sl-RLC-BearerConfigList-r16           SEQUENCE (SIZE (1..maxSL-LCID-r16)) OF
    SL-RLC-BearerConfig-r16                                OPTIONAL,   -- Need R
  sl-MeasConfigCommon-r16               SL-MeasConfigCommon-r16
    OPTIONAL,   -- Need R
  sl-CSI-Acquisition-r16                ENUMERATED {enabled}
    OPTIONAL,   -- Need R
  sl-OffsetDFN-r16                      INTEGER (1..1000)
    OPTIONAL,   -- Need R
  t400-r16                           ENUMERATED {ms100, ms200, ms300, ms400,
    ms600, ms1000, ms1500, ms2000} OPTIONAL,   -- Need R
  sl-MaxNumConsecutiveDTX-r16                  ENUMERATED {n1, n2, n3, n4, n6, n8,
    n16, n32}                                  OPTIONAL,   -- Need R
  sl-SSB-PriorityNR-r16                 INTEGER (1..8)
    OPTIONAL    -- Need R
}
-- TAG-SIB12-STOP
-- ASN1STOP
```

Other existing SIB12 IEs may be used for providing network direction on how a VRU UE is to report position information.

In one implementation, the UE-LocationReporting IE may be provisioned directly in the SL-ConfigCommonNR-16 IE in an existing SIB 12, as illustrated in Table 7 below. The definition in Table 7 is based on a fragment of ASN.1.

TABLE 7

```
-- ASN1START
-- TAG-SIB12-START
SIB12-r16 ::=                        SEQUENCE {
  segmentNumber-r16                    INTEGER (0..63),
  segmentType-r16                      ENUMERATED {notLastSegment, lastSegment},
  segmentContainer-r16                 OCTET STRING
}
SIB12-IEs-r16 ::=                    SEQUENCE {
  sl-ConfigCommonNR-r16                 SL-ConfigCommonNR-r16,
  lateNonCriticalExtension              OCTET STRING               OPTIONAL,
  ...
}
SL-ConfigCommonNR-r16 ::=                   SEQUENCE {
  sl-FreqInfoList-r16                   SEQUENCE (SIZE (1..maxNrofFreqSL-r16)) OF
    SL-FreqConfigCommon-r16                                  OPTIONAL,    -- Need R
```

TABLE 7-continued

```
sl-UE-SelectedConfig-r16                    SL-UE-SelectedConfig-r16
    OPTIONAL,  -- Need R
sl-NR-AnchorCarrierFreqList-r16             SL-NR-AnchorCarrierFreqList-r16
    OPTIONAL,  -- Need R
sl-EUTRA-AnchorCarrierFreqList-r16          SL-EUTRA-AnchorCarrierFreqList-r16
    OPTIONAL,  -- Need R
sl-RadioBearerConfigList-r16                SEQUENCE (SIZE (1..maxNrofSLRB-r16))
    OF SL-RadioBearerConfig-r16                                OPTIONAL,  -- Need R
sl-RLC-BearerConfigList-r16                 SEQUENCE (SIZE (1..maxSL-LCID-r16)) OF
    SL-RLC-BearerConfig-r16                                    OPTIONAL,  -- Need R
sl-MeasConfigCommon-r16                     SL-MeasConfigCommon-r16
    OPTIONAL,  -- Need R
sl-CSI-Acquisition-r16                      ENUMERATED {enabled}
    OPTIONAL,  -- Need R
sl-OffsetDFN-r16                            INTEGER (1..1000)
    OPTIONAL,  -- Need R
t400-r16                                    ENUMERATED {ms100, ms200, ms300, ms400,
    ms600, ms1000, ms1500, ms2000} OPTIONAL,  -- Need R
sl-MaxNumConsecutiveDTX-r16                                    ENUMERATED {n1, n2, n3, n4, n6, n8,
    n16, n32}                                                  OPTIONAL,  -- Need R
sl-SSB-PriorityNR-r16                       INTEGER (1..8)
    OPTIONAL  -- Need R
    UE-LocationReporting                    ENUMERATED       {Absolute,
        Relative, Absolute and Relative}                       OPTIONAL,  -- Need R
}
-- TAG-SIB2-STOP
-- ASN1STOP
```

In another example, the VRU UE 102 position reporting may be configured with a UE-specific configuration via dedicated signaling, in which the network entity 402 configures the VRU UE 102 position reporting as an absolute position, relative position, or an absolute position and relative position. As an example, the UE-LocationReporting IE may be incorporated into existing SL-ConfigDedicatedNR IE, as illustrated in Table 8 below. The definition in Table 8 is based on a fragment of ASN.1.

TABLE 8

```
-- ASN1START
-- TAG-SL-CONFIGDEDICATEDNR-START
*** IEs Omitted ***
}
SL-ConfigDedicatedNR-r16 ::=            SEQUENCE {
sl-PHY-MAC-RLC-Config-r16               SL-PHY-MAC-RLC-Config-r16
    OPTIONAL,  -- Need M
sl-RadioBearerToReleaseList-r16         SEQUENCE (SIZE (1..maxNrofSLRB-
r16)) OF SLRB-Uu-ConfigIndex-r16        OPTIONAL,  -- Need N
sl-RadioBearerToAddModList-r16          SEQUENCE (SIZE (1..maxNrofSLRB-
r16)) OF SL-RadioBearerConfig-r16       OPTIONAL,  -- Need N
sl-MeasConfigInfoToReleaseList-r16      SEQUENCE (SIZE (1..maxNrofSL-
Dest-r16)) OF SL-DestinationIndex-r16       OPTIONAL,  -- Need N
sl-MeasConfigInfoToAddModList-r16       SEQUENCE (SIZE (1..maxNrofSL-
Dest-r16)) OF SL-MeasConfigInfo-r16         OPTIONAL,  -- Need N
t400-r16                                ENUMERATED {ms100, ms200, ms300, ms400,
ms600, ms1000, ms1500, ms2000} OPTIONAL,  -- Need M
UE-LocationReporting                    ENUMERATED
{Absolute, Relative, Absolute and Relative}     OPTIONAL,  -- Need M
...
}
*** IEs Omitted ***
```

The SL-ConfigDedicatedNR IE that incorporates the UE-LocationReporting IE may be incorporated in the RRCReconfiguration-v1610 IEs, as illustrated in Table 9 below. The definition in Table 9 is based on a fragment of ASN.1.

TABLE 9

```
-- ASN1START
-- TAG-RRCRECONFIGURATION-START
*** IEs Omitted ***
}
RRCReconfiguration-v1610-IEs ::=         SEQUENCE {
    otherConfig-v1610                    OtherConfig-v1610 OPTIONAL, -- Need M
    bap-Config-r16                       SetupRelease { BAP-Config-r16 }
        OPTIONAL, -- Need M
    iab-IP-AddressConfigurationList-r16          IAB-IP-AddressConfigurationList-r16
        OPTIONAL, -- Need M
    conditionalReconfiguration-r16               ConditionalReconfiguration-r16
        OPTIONAL, -- Need M
    daps-SourceRelease-r16               ENUMERATED{true}
        OPTIONAL, -- Need N
    t316-r16                     SetupRelease {T316-r16}
        OPTIONAL, -- Need M
    needForGapsConfigNR-r16              SetupRelease {NeedForGapsConfigNR-r16}
        OPTIONAL, -- Need M
    onDemandSIB-Request-r16              SetupRelease { OnDemandSIB-Request-r16 }
        OPTIONAL, -- Need M
    dedicatedPosSysInfoDelivery-r16          OCTET STRING (CONTAINING
        PosSystemInformation-r16-IEs)                    OPTIONAL, -- Need N
    sl-ConfigDedicatedNR-r16             SetupRelease {SL-ConfigDedicatedNR-r16}
        OPTIONAL, -- Need M
    sl-ConfigDedicatedEUTRA-Info-r16             SetupRelease {SL-
        ConfigDedicatedEUTRA-Info-r16}                           OPTIONAL, -- Need M
    targetCellSMTC-SCG-r16       SSB-MTC           OPTIONAL, -- Need S
    nonCriticalExtension                 SEQUENCE { }     OPTIONAL
    sl-UE-PRSConfig-r16          SL-UE-PRSConfig-r16
        OPTIONAL,  -- Need R
}
*** IEs Omitted ***
```

In one implementation, the UE-LocationReporting IE may be provisioned directly in an RRCReconfiguration message, as illustrated in Table 10 below. The definition in Table 10 is based on a fragment of ASN.1.

TABLE 10

```
-- ASN1START
-- TAG-RRCRECONFIGURATION-START
*** IEs Omitted ***
}
RRCReconfiguration-v1610-IEs ::=         SEQUENCE {
    otherConfig-v1610                    OtherConfig-v1610 OPTIONAL, -- Need M
    bap-Config-r16                       SetupRelease { BAP-Config-r16 }
        OPTIONAL, -- Need M
    iab-IP-AddressConfigurationList-r16          IAB-IP-AddressConfigurationList-r16
        OPTIONAL, -- Need M
    conditionalReconfiguration-r16               ConditionalReconfiguration-r16
        OPTIONAL, -- Need M
    daps-SourceRelease-r16               ENUMERATED{true}
        OPTIONAL, -- Need N
    t316-r16                     SetupRelease {T316-r16}
        OPTIONAL, -- Need M
    needForGapsConfigNR-r16              SetupRelease {NeedForGapsConfigNR-r16}
        OPTIONAL, -- Need M
    onDemandSIB-Request-r16              SetupRelease { OnDemandSIB-Request-r16 }
        OPTIONAL, -- Need M
    dedicatedPosSysInfoDelivery-r16          OCTET STRING (CONTAINING
        PosSystemInformation-r16-IEs)            OPTIONAL, -- Need N
    sl-ConfigDedicatedNR-r16             SetupRelease {SL-ConfigDedicatedNR-r16}
        OPTIONAL, -- Need M
    sl-ConfigDedicatedEUTRA-Info-r16             SetupRelease {SL-
        ConfigDedicatedEUTRA-Info-r16}           OPTIONAL, -- Need M
    targetCellSMTC-SCG-r16       SSB-MTC
        OPTIONAL, -- Need S
    nonCriticalExtension                 SEQUENCE { }
```

TABLE 10-continued

| | |
|---|---|
| OPTIONAL | |
| sl-UE-PRSConfig-r16 | SL-UE-PRSConfig-r16 |
| OPTIONAL, -- Need M | |
| UE-LocationReporting | ENUMERATED {Absolute, Relative, Absolute and |
| Relative} | OPTIONAL, -- Need M |
| } | |
| *** IEs Omitted *** | |

In another example, the VRU UE 102 position reporting configuration may be stored in the VRU UE's pre-configuration for out-of-coverage operation. For example, a SL-UE-SelectedPreConfig-r16 IE as shown above in Table 5 may be incorporated into NR pre-configuration parameters through the existing SL-UE-SelectedConfig-r16 IE, as illustrated as illustrated in Table 11 below. The definition in Table 11 is based on a fragment of ASN.1.

TABLE 11

| | |
|---|---|
| -- ASN1START | |
| -- TAG-SL-PRECONFIGURATIONNR-START | |
| SL-PreconfigurationNR-r16 ::= | SEQUENCE { |
| sidelinkPreconfigNR-r16 | SidelinkPreconfigNR-r16, |
| ... | |
| } | |
| SidelinkPreconfigNR-r16 ::= | SEQUENCE { |
| sl-PreconfigFreqInfoList-r16 | SEQUENCE (SIZE (1..maxNrofFreqSL-r16)) |
|    OF SL-FreqConfigCommon-r16 | OPTIONAL, |
| sl-PreconfigNR-AnchorCarrierFreqList-r16 | SL-NR-AnchorCarrierFreqList-r16 |
|    OPTIONAL, | |
| sl-PreconfigEUTRA-AnchorCarrierFreqList-r16 | SL-EUTRA- |
|    AnchorCarrierFreqList-r16 | OPTIONAL, |
| sl-RadioBearerPreConfigList-r16 | SEQUENCE (SIZE (1..maxNrofSLRB- |
|    r16)) OF SL-RadioBearerConfig-r16 | OPTIONAL, |
| sl-RLC-BearerPreConfigList-r16 | SEQUENCE (SIZE (1..maxSL-LCID- |
|    r16)) OF SL-RLC-BearerConfig-r16 | OPTIONAL, |
| sl-MeasPreConfig-r16 | SL-MeasConfigCommon-r16 |
|    OPTIONAL, | |
| sl-OffsetDFN-r16 | INTEGER (1..1000) OPTIONAL, |
| t400-r16 | ENUMERATED{ms100, ms200, ms300, |
|    ms400, ms600, ms1000, ms1500, ms2000} | OPTIONAL, |
| sl-MaxNumConsecutiveDTX-r16 | ENUMERATED {n1, n2, n3, n4, n6, n8, |
|    n16, n32} | OPTIONAL, |
| sl-SSB-PriorityNR-r16 | INTEGER (1..8) |
|    OPTIONAL, | |
| sl-PreconfigGeneral-r16 | SL-PreconfigGeneral-r16 |
|    OPTIONAL, | |
| sl-UE-SelectedPreConfig-r16 | SL-UE-SelectedConfig-r16 |
|    OPTIONAL, | |
| sl-CSI-Acquisition-r16 | ENUMERATED {enabled} |
|    OPTIONAL, | |
| sl-RoHC-Profiles-r16 | SL-RoHC-Profiles-r16 |
|    OPTIONAL, | |
| sl-MaxCID-r16 | INTEGER (1..16383) |
|    DEFAULT 15, | |
| ... | |
| } | |
| *** IEs Omitted *** | |
| -- TAG-SL-PRECONFIGURATIONNR-STOP | |
| -- ASN1STOP | |

In one implementation, the UE-LocationReporting IE may be provisioned directly in NR pre-configuration parameters in SidelinkPreconfigNR in an SL-PreconfigurationNR-r16 message, as illustrated in Table 12 below. The definition in Table 12 is based on a fragment of ASN.1.

TABLE 12

```
-- ASN1START
-- TAG-SL-PRECONFIGURATIONNR-START
SL-PreconfigurationNR-r16 ::=            SEQUENCE {
  sidelinkPreconfigNR-r16                  SidelinkPreconfigNR-r16,
  ...
}
SidelinkPreconfigNR-r16 ::=              SEQUENCE {
  sl-PreconfigFreqInfoList-r16             SEQUENCE (SIZE (1..maxNrofFreqSL-r16))
    OF SL-FreqConfigCommon-r16               OPTIONAL,
  sl-PreconfigNR-AnchorCarrierFreqList-r16   SL-NR-AnchorCarrierFreqList-r16
    OPTIONAL,
  sl-PreconfigEUTRA-AnchorCarrierFreqList-r16  SL-EUTRA-
    AnchorCarrierFreqList-r16                  OPTIONAL,
  sl-RadioBearerPreConfigList-r16          SEQUENCE (SIZE (1..maxNrofSLRB-
    r16)) OF SL-RadioBearerConfig-r16          OPTIONAL,
  sl-RLC-BearerPreConfigList-r16           SEQUENCE (SIZE (1..maxSL-LCID-
    r16)) OF SL-RLC-BearerConfig-r16           OPTIONAL,
  sl-MeasPreConfig-r16                     SL-MeasConfigCommon-r16
    OPTIONAL,
  sl-OffsetDFN-r16                         INTEGER (1..1000)
    OPTIONAL,
  t400-r16                                 ENUMERATED{ms100, ms200, ms300,
    ms400, ms600, ms1000, ms1500, ms2000}      OPTIONAL,
  sl-MaxNumConsecutiveDTX-r16              ENUMERATED {n1, n2, n3, n4, n6, n8,
    n16, n32}                                  OPTIONAL,
  sl-SSB-PriorityNR-r16                    INTEGER (1..8)
    OPTIONAL,
  sl-PreconfigGeneral-r16                  SL-PreconfigGeneral-r16
    OPTIONAL,
  sl-UE-SelectedPreConfig-r16              SL-UE-SelectedConfig-r16
    OPTIONAL,
  sl-CSI-Acquisition-r16                   ENUMERATED {enabled}
    OPTIONAL,
  sl-RoHC-Profiles-r16                     SL-RoHC-Profiles-r16
    OPTIONAL,
  sl-MaxCID-r16                            INTEGER (1..16383)
    DEFAULT 15,
  UE-LocationReporting                     ENUMERATED {Absolute, Relative, Absolute
    and Relative}                              OPTIONAL
  ...
}
*** IEs Omitted ***
-- TAG-SL-PRECONFIGURATIONNR-STOP
-- ASN1STOP
```

The VRU UE 102 may be configured to report a relative position using an IE that, as an example, may be referred to as "UE-LocationRelative," e.g., as illustrated in Table 13 below.

TABLE 13

```
UE-LocationRelative            ::= SEQUENCE {
  ue-heading                     UE-Heading
  referenceID                    ReferencePositionIdentifier
  referencePosition              ReferencePosition (optional),
  ue-LocalPosition                 UE-LocalPosition
  ue-DistanceENU                   UE-DistanceENU,
}
UE-Heading                     ::= SEQUENCE {
  Heading Angle                  ::= INTEGER (0..3601),
  Heading AngleAccuracy          ::= INTEGER (0..3600)
}
ReferencePositionIdentifier    ::= SEQUENCE {
  referencePositionIdentifier    ::= INTEGER (0..3601),
}
ReferencePosition              ::= SEQUENCE {
  referencePositionLLA           ReferencePositionLLA,
  referencePositionLLAAccuracy     ReferencePositionLLAAccuracy
    OPTIONAL,
}
```

TABLE 13-continued

```
ReferencePositionLLA          ::= SEQUENCE {
referencePositionLat          ::= INTEGER (-900000000..900000001),
referencePositionLon          ::= INTEGER (-1799999999..1800000001),
referencePositionAlt          ::= INTEGER (-4096..61439) OPTIONAL,
}
ReferencePositionLLAAccuracy ::= SEQUENCE {
ReferencePosition-SemiMajorAxisAccuracy            ::= ENUMERATED
{m0dot1, m0dot5,          m1, m5, m10, m50, unavailable }
ReferencePosition-SemiMinorAxisAccuracy            ::= ENUMERATED
{m0dot1, m0dot5,          m1, m5, m10, m50, unavailable }
ReferencePosition-SemiMajorAxisOrientationAccuracy ::= INTEGER (0..3600)
}
UE-DistanceENU                ::= SEQUENCE {
ue-DistanceScalar             ::= INTEGER (-32767..32767)   OPTIONAL
ue-DistanceE                  ::= INTEGER (-32767..32767),
ue-DistanceN                  ::= INTEGER (-32767..32767),
ue-DistanceU                  ::= INTEGER (-32767..32767)   OPTIONAL,
ue-DistanceENUAccuracy            UE-DistanceENUAccuracy
  OPTIONAL,
}
UE-DistanceENUAccuracy ::= SEQUENCE {
DistanceENUAccuracyE          ::= ENUMERATED {m0dot1, m0dot5, m1, m5,
   m10, m50, m100, m200, m500 }
DistanceENUAccuracyN          ::= ENUMERATED {m0dot1, m0dot5, m1, m5,
   m10, m50, m100, m200, m500 }
DistanceENUAccuracyU          ::= ENUMERATED {m0dot1, m0dot5, m1, m5,
   m10, m50, m100, m200, m500 } OPTIONAL
}
UE-Placement                  ::= ENUMERATED {SidewalkOnLeft,
   SidewalkOnRight, BikeLaneOnLeft, BikeLaneOnRight,
   BreakdownLaneOnLeft, BreakdownLaneOnRight, ShoulderOnLeft,
   ShoulderOnRight, RoadOnLeft, RoadOnRight, Crosswalk, spare1,
   spare2, spare3, spare4}
```

If desired, other definitions for Latitude/Longitude/Altitude coordinate system (LLA) accuracy may be defined, such as an INTEGER range. Moreover, other definitions for DistanceENU (east-north-up) accuracy may be used, such as an INTEGER range.

Definitions of the relative position IEs from Table 13 are provided in Table 14 below.

TABLE 14

UE-LocationRelative field description referencePositionIdentifier
Specifies a commonly defined identifier for the reference position.
referencePositionLat
Specifies the UE latitude semi-major axis accuracy. Value 1 corresponds to 0.1 meters, value 2 corresponds to 0.2 meters, and so on.
referencePositionLon
Specifies the UE longitude semi-minor axis accuracy. Value 1 corresponds to 0.1 meters, value 2 corresponds to 0.2 meters, and so on.
referencePositionAlt
Specifies the UE elevation semi-major axis orientation in degrees from WGS84 north. Value 0 means 0 degrees, Value 1 means 0.1 degrees, and so on.
ReferencePosition-SemiMajorAxisAccuracy
Specifies the ReferencePosition semi-major axis accuracy. Value 1 corresponds to 0.1 meters, value 2 corresponds to 0.2 meters, and so on
ReferencePosition-SemiMinorAxisAccuracy
Specifies the ReferencePosition semi-minor axis accuracy. Value 1 corresponds to 0.1 meters, value 2 corresponds to 0.2 meters, and so on.
ReferencePosition-SemiMajorAxisOrientationAccuracy
Specifies the ReferencePosition semi-major axis orientation in degrees from WGS84 north. Value 0 means 0 degrees, Value 1 means 0.1 degrees, and so on.
ue-DistanceScalar
Specifies the UE scalar distance from ReferencePosition in units of 0.1 meters.
ue-DistanceE
Specifies the UE distance from ReferencePosition along the East direction in units of 0.1 meters.
ue-DistanceN

TABLE 14-continued

UE-LocationRelative field description

Specifies the UE distance from ReferencePosition along the North direction in units of 0.1 meters.
ue-DistanceU
Specifies the UE distance from ReferencePosition along the Up direction in units of 0.1 meters.
DistanceENUAccuracyE
Specifies the accuracy in meters with which a UE determines East distance from ReferencePosition. m0dot1 corresponds to 0.1 m, m0dot5 corresponds to 0.5 m, m1 corresponds to 1 m and so on.
DistanceENUAccuracyN
Specifies the accuracy in meters with which a UE determines North distance from ReferencePosition. m0dot1 corresponds to 0.1 m, m0dot5 corresponds to 0.5 m, m1 corresponds to 1 m and so on.
DistanceENUAccuracyU
Specifies the accuracy in meters with which a UE determines Up distance from ReferencePosition. m0dot1 corresponds to 0.1 m, m0dot5 corresponds to 0.5 m, m1 corresponds to 1 m and so on.
HeadingAngle
Specifies the heading of the UE. LSB units of 0.1 degrees
HeadingAngleAccuracy
Specifies the accuracy with which the UE determines HeadingAngle. LSB units of 0.1 degrees
UE-Placement
Specifies UE location in the road where right and left are with respect to Orientation Angle.

The VRU UE 102 relative position may be reported to a network entity, e.g., using an existing CommonLocationInfo IE in a MeasurementReport message.

Figure 6:
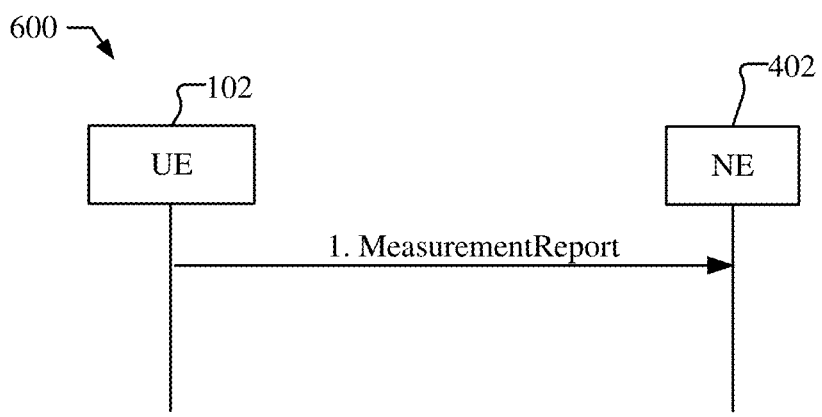
FIG. 6 illustrates a signal flow for a UE to send its relative position to a network entity.

FIG. 6, by way of example, illustrates a signal flow 600 of a VRU UE 102 sending its relative position to a network entity (NE) 402. The NE 402, for example, may be the server 220 or the base station 202 shown in FIG. 2 or another network entity, including the OBU 110 or RSU 120.

As illustrated in stage 1 of FIG. 6, the VRU UE 102 sends a MeasurementReport message to the NE 402. The MeasurementReport message, for example, includes the relative position information in the UE-LocationRelative IE that is incorporated in a CommonLocationInfo IE, which is a child IE of MeasResults, as illustrated in Tables 15 and 16 below. The definitions in Tables 15 and 16 are based on a fragment of ASN.1.

TABLE 15

```
-- ASN1START
-- TAG-MEASUREMENTREPORT-START
MeasurementReport ::=        SEQUENCE {
criticalExtensions           CHOICE {
measurementReport               MeasurementReport-IEs,
criticalExtensionsFuture        SEQUENCE { }
}
}
MeasurementReport-IEs ::=    SEQUENCE {
measResults                     MeasResults,
lateNonCriticalExtension        OCTET STRING     OPTIONAL,
nonCriticalExtension            SEQUENCE{ }      OPTIONAL
}
-- TAG-MEASUREMENTREPORT-STOP
-- ASN1STOP
```

TABLE 16

```
-- ASN1START
-- TAG-COMMONLOCATIONINFO-START
CommonLocationInfo-r16 ::=SEQUENCE {
  gnss-TOD-msec-r16      OCTET STRING         OPTIONAL,
  locationTimestamp-r16  OCTET STRING         OPTIONAL,
  locationCoordinate-r16 OCTET STRING         OPTIONAL,
  locationError-r16      OCTET STRING         OPTIONAL,
  locationSource-r16     OCTET STRING         OPTIONAL,
  velocityEstimate-r16   OCTET STRING         OPTIONAL,
  ue-LocationRelative    UE-LocationRelative  OPTIONAL
}
-- TAG-COMMONLOCATIONINFO-STOP
-- ASN1STOP
```

In some implementations, the ue-LocationCapability IE may be added as a new IE in the MeasurementReport message, or as part of a newly defined RRC message. In an implementation in which the VRU UE 102 sends the relative position information using the application layer, an application-layer message may be defined for inclusion of the ue-LocationCapability IE.

In some implementations, the VRU UE 102 may send its relative position information directly to another UE, e.g., to OBU 110 shown in FIGS. 1 and 2. In an implementation in which the VRU UE 102 relative position information is provided using a PC5-RRC message, the ue-LocationRelative IE may be added to a MeasurementReportSidelink message or to a newly defined PC5-RRC message for relative position reporting.

In an implementation in which the VRU UE 102 relative position information is provided using a PC5-S message, the ue-LocationRelative IE may be added to a PC5-S message generated for that purpose.

In an implementation in which the VRU UE 102 relative position information is provided using the application layer, an application-layer message may be defined for inclusion of the ue-LocationRelative IE.

The information elements transmitted by the VRU UE 102 or received by the VRU UE 102 using PC5 or Uu may be standardized for signaling over the network, e.g., via Location Positioning Protocol (LPP) and over the air via Uu or PC5 signaling.

Figure 7:
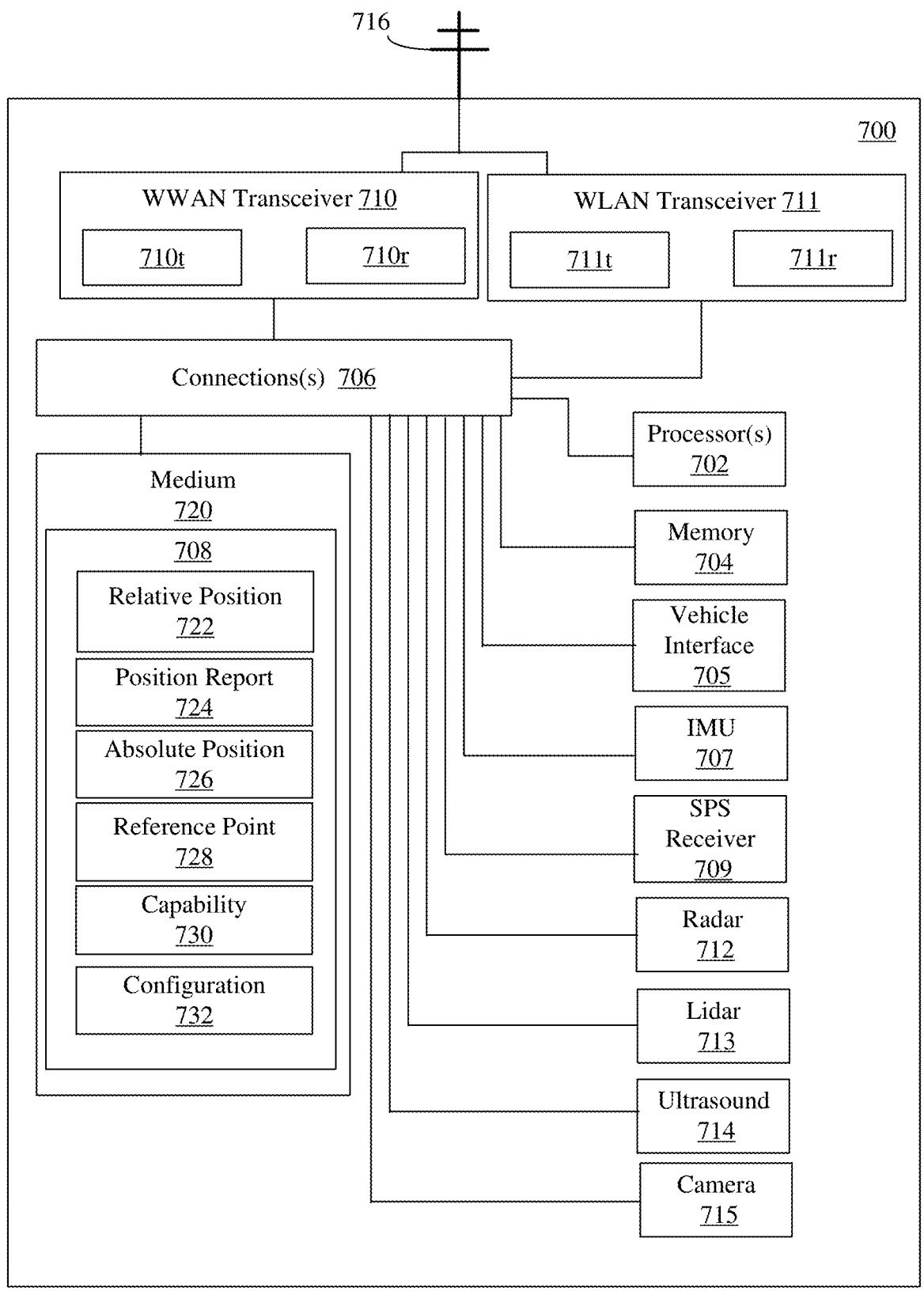
FIG. 7 shows a schematic block diagram illustrating certain exemplary features of a user device configured to determine and report its relative position to one or more network entities.

FIG. 7 shows a schematic block diagram illustrating certain exemplary features of a user equipment (UE) 700, which may be used by a VRU, such as a pedestrian, bicyclist, motorcyclist, or any other road space user that is at increased risk of injury or death in any collision with a vehicle. The UE 700, for example, may serve as UE 102 illustrated in FIGS. 1-6, and may be configured to determine and report its relative position to one or more network entities, as discussed herein. The UE 700 may perform the signal flows illustrated in FIGS. 4-6 and the process flow shown in FIG. 8, and supporting algorithms described herein, including those discussed in reference to FIG. 3.

The UE 700 may, for example, include one or more processors 702, memory 704, and one or more sensors. For example, if the UE 700 is used by a vehicle, such as, but not limited to a bicyclist or motorcyclist, the UE 700 may include a vehicle interface 705 with sensory input, including a wheel tick sensor, speed, acceleration, etc., that may be provided from the vehicle to UE 700. The UE 700 may include an inertial measurement unit (IMU) 707 that may include, e.g., an accelerometer, gyroscope, magnetometers, etc., which may be used to detect orientation with respect to a global or local reference frame, and the motion or one or more motion characteristics of the UE 700. The UE 700 may include a satellite positioning system (SPS) receiver 709 to receive SPS signals with which an approximate or absolute position may be determined. The UE 700 may further include one or more of radar (sensor) 712, lidar (sensor) 713, ultrasound (sensor) 714, with which ranging data may be acquired. The UE 700 may further include a camera 715 to acquire optical data of the environment, with which object detection may be performed, e.g., to identify reference points, and ranging may be performed. Additionally, the UE 700 includes an external interface including, e.g., at least one of a Wireless Wide Area Network (WWAN) transceiver 710, and a Wireless Local Area Network (WLAN) transceiver 711. The one or more processors 702, the one or more sensors, and the external interface, may be operatively coupled with one or more connections 706 (e.g., buses, lines, fibers, links, etc.) to non-transitory computer readable medium 720 and memory 704. The UE 700 may further include additional items, which are not shown, such as a user interface that may include e.g., a display, a keypad or other input device, such as virtual keypad on the display, through which a user may interface with the user device. In certain example implementations, all or part of UE 700 may take the form of a chipset, and/or the like.

Transceiver 710 may be, e.g., a cellular transceiver, and may be configured to transmit and receive inter-vehicle communications, as illustrated in FIGS. 1 and 2. The transceiver 710 may include a transmitter 710*t* enabled to transmit one or more signals over one or more types of wireless communication links and a receiver 710*r* to receive one or more signals transmitted over the one or more types of wireless communication links. Transceiver 711 may be, e.g., a short-range transceiver, and may be configured to transmit and receive inter-vehicle communications wirelessly, as illustrated in FIGS. 1 and 2. The transceiver 711 may include a transmitter 711*t* enabled to transmit one or more signals over one or more types of wireless communication links and a receiver 711*r* to receive one or more signals transmitted over the one or more types of wireless communication links. The transceivers 710 and 711 enable the UE 700 to communicate with network entities including other UEs using D2D communication links, such as DSRC, C-V2X, PC5, or 5G NR.

In some embodiments, UE 700 may include antenna 716, which may be internal or external. The antenna 716 may be used to transmit and/or receive signals processed by transceiver 710 and/or transceiver 711. In some embodiments, antenna 716 may be coupled to transceiver 710 and/or transceiver 711. In some embodiments, measurements of signals received (transmitted) by UE 700 may be performed at the point of connection of the antenna 716 and transceiver 710 and/or transceiver 711. For example, the measurement point of reference for received (transmitted) RF signal measurements may be an input (output) terminal of the receivers 710r, 711r (transmitters 710t, 711t) and an output (input) terminal of the antenna 716. In a UE 700 with multiple antennas 716 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 700, e.g., based on the orientation of the UE 700 to the global or local reference frame as measured by the IMU 707.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of UE 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in UE 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include a relative position determination module 722 that when implemented by the one or more processors 702 configures the one or more processors 702 to determine a relative position of the UE 700. For example, the one or more processors 702 may be configured to determine a relative position with respect to one or more reference points, which may be stationary or moving. The one or more processors 702, for example, may be configured to identify reference points, e.g., based on reference point information provisioned or downloaded, such as road information, topographic information, landmark information, map information, etc. as well as a position and orientation of the UE 700 determined using one or more positioning techniques including SPS, cellular based, dead reckoning, etc., using data from SPS receiver 709, transceivers 710 and/or 711, IMU 707, vehicle interface 705, as well as any other sensors, such as radar 712, lidar 713, ultrasound 714, and camera 715. The one or more processors 702 may be configured to determine the distance or distance vector to the identified one or more reference points using one or more of the on-board sensors, such as radar 712, lidar 713, ultrasound 714, and camera 715, as well as transceivers 710 and/or 711. The one or more processors 702 may be configured to determine the accuracy of the distance measurement to each of the one or more reference points. The one or more processors 702 may be configured to determine additional relative position information, such as the placement with respect to one or more street (design) elements, based on sensor information, such as data from SPS receiver 709, transceivers 710 and/or 711, IMU 707, vehicle interface 705, as well as any other sensors, such as radar 712, lidar 713, ultrasound 714, and camera 715. The one or more processors 702 may be configured to determine relative position information such as heading, e.g., using one or more positioning techniques including SPS, cellular based, dead reckoning, etc., using data from SPS receiver 709, transceivers 710 and/or 711, IMU 707 (e.g., gyroscope or magnetometer), vehicle interface 705, as well as any other sensors, such as radar 712, lidar 713, ultrasound 714, and camera 715. The one or more processors 702 may be configured to determine additional relative position information such as an accuracy of the relative position information, a beam identifier of a beam received by receiver 710r, an identification of the type of measurement or sensor used to determine the relative position information, etc.

The medium 720 and/or memory 704 may include a position report module 724 that when implemented by the one or more processors 702 configures the one or more processors 702 to send a position information report, e.g., MeasurementReport message, via transceiver 710 or 711, to one or more network entities. The position information included in the report may include the determined relative position information, e.g., UE-LocationRelative, including identification of the one or more reference points and a distance to each of the one or more reference points, and in some implementations, one or more of placement with respect to one or more street (design) elements, heading, accuracy of the relative position information, a beam identifier of a beam from a wireless transmitter received by UE 700, an identification of the type of measurement or sensor used to determine the relative position information, etc. The position information included in the report may additionally or alternatively include absolute position information.

The medium 720 and/or memory 704 may include an absolute position determination module 726 that when implemented by the one or more processors 702 configures the one or more processors 702 to determine an absolute position of the UE 700, e.g., using SPS positioning techniques using data from SPS receiver 709, and/or cellular based positioning techniques using data from transceivers 710 and/or 711.

The medium 720 and/or memory 704 may include a reference point module 728 that when implemented by the one or more processors 702 configures the one or more processors 702 to obtain information for one or more reference points, that may be used to identify the reference points and determine distances. The information may be provisioned in UE 700, e.g., stored in memory 704 or medium 720, and/or may be received from a network entity, via transceiver 710 or 711. The information, for example, may be relative to stationary or fixed reference points, such as road information, topographic information, landmark information, map, map information such as map version, resolution, type, etc. The information may identify reference points and provide a unique identifier for each reference point. The information may be for moving reference points, such as other vehicles and may include position information for other vehicles, as well as e.g., velocity, trajectory, etc., with which the relative position with respect to the vehicles may be determined. The information may be for wireless reference points, and may include information used for receiving wireless signals, e.g., positioning assistance data, including beam information.

The medium 720 and/or memory 704 may include a capability module 730 that when implemented by the one or more processors 702 configures the one or more processors 702 to send a message, e.g., ue-LocationCapability IE in a SidelinkUEInformationNR message, UECapabilityInformation message, UEInformationReponse message, UECapabilityInformationSidelink message, Direct Communication Request message, etc., to a network entity, via transceiver 710 or 711, that indicates the positioning capability of the UE, e.g., to determine and report at least one of a relative position, an absolute position, or an absolute and relative position. The one or more processors 702 may be configured to send the capability message in response to an enquiry from the network entity.

The medium 720 and/or memory 704 may include a configuration module 732 that when implemented by the one or more processors 702 configures the one or more processors 702 to receive a message, e.g., including a UE-LocationReporting IE in a SL-UE-SelectedConfig message, SL-ConfigCommonNR message, SL-ConfigDedicatedNR message, RRCReconfiguration message, SL-UE-SelectedPreConfig message, SidelinkPreconfigNR message, etc., from a network entity, via transceiver 710 or 711, that configures the one or more processors 702 to determine and report at least one of a relative position, an absolute position, or an absolute and relative position.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer implemented program code 708. For example, the non-transitory computer readable medium including program code 708 stored thereon may include program code 708 to support positioning of a VRU UE including determining and reporting a relative position, in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 or 711 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random-access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
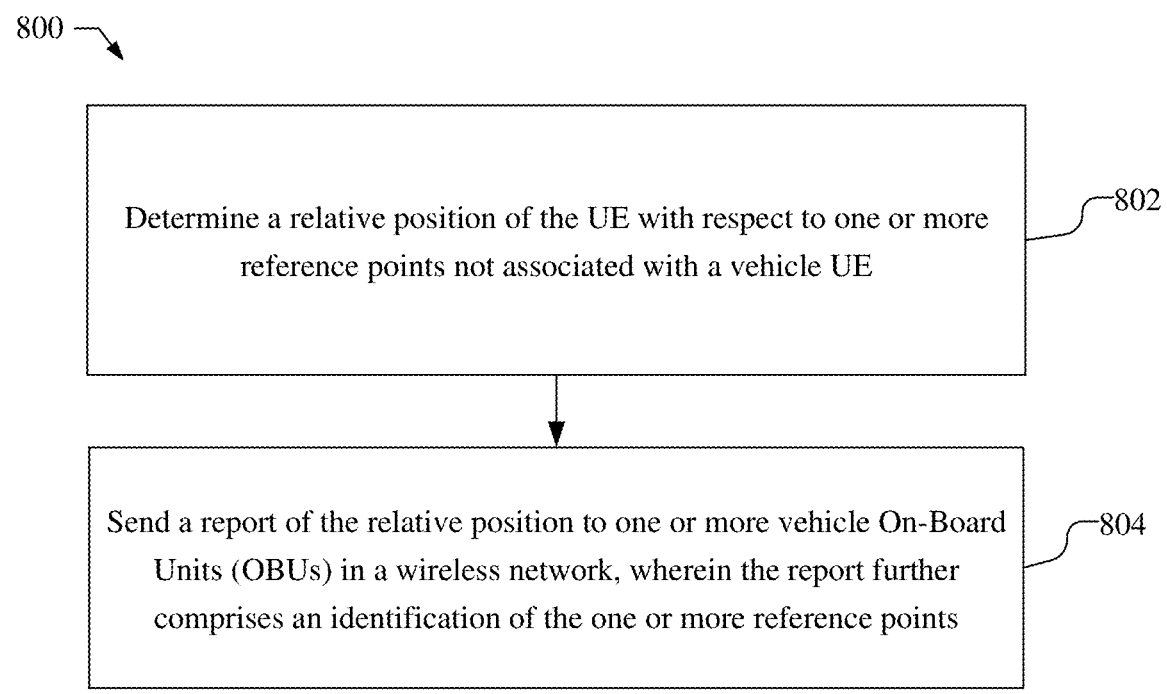
FIG. 8 is a flow chart illustrating a method of performing positioning by a UE.

FIG. 8 is a flow chart 800 illustrating a method of performing positioning by a UE, such as UE 102 that may be used with a VRU, as shown in FIGS. 1-7.

At block 802, the UE determines a relative position of the UE with respect to one or more reference points, e.g., as discussed in reference to FIG. 3 and Tables 13-16. In some implementations, the relative position may be a distance or distance vector to each of the one or more reference points. In some implementations, the relative position may further include at least one of a heading of the UE and a placement of the UE with respect to one or more street (design) elements, e.g., as discussed in reference to FIG. 3 and Tables 13-16. In some implementations, the relative position may be determined based on one or more of radar, lidar, ultrasonic positioning, or camera, e.g., as discussed in reference to FIG. 3. In some implementations, the relative position may be determined based on wireless positioning, e.g., as discussed in reference to FIG. 3. For example, at least one of the one or more reference points may be a wireless transmitter, and the report of the relative position may comprise a beam identifier of a beam received from the wireless transmitter, e.g., as discussed in reference to FIGS. 2 and 3. A means for determining a relative position of the UE with respect to one or more reference points may be, e.g., the transceivers 710 or 711, IMU 707, SPS receiver 709, radar 712, lidar 713, ultrasound 714, and camera 715, and/or the one or more processors 702 with dedicated hardware or implementing executable code or software instructions in memory 704 and/or medium 720, such as the relative position determination module 722.

At block 804, the UE sends a report of the relative position to one or more vehicle On-Board-Units (OBUs) in a wireless network, wherein the report further comprises an identification of the one or more reference points, e.g., as discussed in reference to FIGS. 3 and 6 and Tables 13-16. In some implementations, the report of the relative position may further include at least one of a heading of the UE and a placement of the UE with respect to one or more street (design) elements, e.g., as discussed in reference to FIG. 3 and Tables 13-16. In some implementations, at least one of the one or more reference points may be a wireless transmitter and the report of the relative position may further include a beam identifier of a beam received from the wireless transmitter, e.g., as discussed in reference to FIGS. 2 and 3. In some implementations, the report of the relative position is sent using one of Uu Radio Resource Control (RRC) signaling, PC5-RRC signaling, or PC5-Signaling (S) signaling, e.g., as discussed in reference to FIGS. 3 and 6 and Tables 13-16. In some implementations, the report of the relative position is sent using application-layer signaling, e.g., as discussed in reference to FIGS. 3 and 6 and Tables 13-16. For example, the report of the relative position may be sent in a groupcast or broadcast message. A means for sending a report of the relative position to one or more vehicle On-Board Units (OBUs) in a wireless network, wherein the report further comprises an identification of the one or more reference points may be, e.g., the transceivers 710 or 711, and/or the one or more processors 702 with dedicated hardware or implementing executable code or software instructions in memory 704 and/or medium 720, such as the position report module 724.

In one implementation, the one or more reference points may be at least one of a stationary reference point and a moving reference point, e.g., as discussed in reference to FIG. 3. The moving reference point, for example, may be associated with a vehicle OBU of the one or more vehicle OBUs.

In one implementation, the UE may further determine an absolute position of the UE, wherein the report further includes the absolute position, e.g., as discussed in reference to FIG. 3. A means for determining an absolute position of the UE, wherein the report further comprises the absolute position may be, e.g., the transceivers 710 or 711, SPS receiver 709, and/or the one or more processors 702 with dedicated hardware or implementing executable code or software instructions in memory 704 and/or medium 720, such as the absolute position determination module 726.

In one implementation, the UE may obtain map information for one or more stationary reference points, wherein determining the relative position of the UE is based on the map information for one or more stationary reference points, e.g., as discussed in reference to FIG. 3. For example, the map information for the one or more stationary reference points may include at least one of road information, topographic information, or landmark information. A means for obtaining map information for one or more stationary reference points, wherein determining the relative position of the UE is based on the map information for one or more stationary reference points may be, e.g., the transceivers 710 or 711 and/or the one or more processors 702 with dedicated hardware or implementing executable code or software instructions in memory 704 and/or medium 720, such as the reference point module 728.

In one implementation, the UE may receive one or more messages from a network entity comprising position information for a moving reference point, wherein the relative position of the UE is with respect to the moving reference point and is determined based on the one or more messages, e.g., as discussed in reference to FIG. 3. A means for receiving one or more messages from a network entity comprising position information for a moving reference point, wherein the relative position of the UE is with respect to the moving reference point and is determined based on the one or more messages may be, e.g., the transceivers 710 or 711 and/or the one or more processors 702 with dedicated hardware or implementing executable code or software instructions in memory 704 and/or medium 720, such as the reference point module 728.

In one implementation, the UE may send a message to a network entity indicating a positioning capability of the UE to determine at least one of a relative position, an absolute position, or an absolute and relative position of the UE, as discussed in reference to FIG. 3 and Tables 1-4. A means for sending a message to a network entity indicating a positioning capability to determine and report at least one of a relative position, an absolute position, or an absolute and relative position of the UE may be, e.g., the transceivers 710 or 711 and/or the one or more processors 702 with dedicated hardware or implementing executable code or software instructions in memory 704 and/or medium 720, such as the capability module 730.

In one implementation, the UE may receive a message from a network entity to configure the UE to report at least one of a relative position, an absolute position, or an absolute and relative position, as discussed in reference to FIG. 3 and Tables 5-12. A means for receiving a message from a network entity to configure the UE to report at least one of a relative position, an absolute position, or an absolute and relative position may be, e.g., the transceivers 710 or 711 and/or the one or more processors 702 with dedicated hardware or implementing executable code or software instructions in memory 704 and/or medium 720, such as the configuration module 732.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a user equipment (UE) for performing positioning, the method comprising: determining a relative position of the UE with respect to one or more reference points; and sending a report of the relative position to one or more vehicle On-Board Units (OBUs) in a wireless network, wherein the report further comprises an identification of the one or more reference points.

Clause 2. The method of clause 1, wherein the report of the relative position further comprises a distance or distance vector with respect to the one or more reference points.

Clause 3. The method of any of clauses 1-2, wherein the report of the relative position further comprises a heading of the UE and a placement of the UE with respect to one or more street elements.

Clause 4. The method of any of clauses 1-3, wherein the relative position is determined based on one or more of radar, lidar, ultrasonic positioning, or camera.

Clause 5. The method of any of clauses 1-4, wherein the relative position is determined based on wireless positioning.

Clause 6. The method of clause 5, wherein at least one of the one or more reference points comprises a wireless transmitter and the report of the relative position further comprises a beam identifier of a beam received from the wireless transmitter.

Clause 7. The method of any of clauses 1-6, wherein the one or more reference points comprise at least one of a stationary reference point and a moving reference point.

Clause 8. The method of clause 6, wherein the moving reference point is associated with a vehicle OBU of the one or more vehicle OBUs.

Clause 9. The method of any of clauses 1-8, wherein the identification of the one or more reference points comprises an absolute position of the one or more reference points.

Clause 10. The method of any of clauses 1-9, the method further comprising determining an absolute position of the UE, wherein the report further comprises the absolute position.

Clause 11. The method of any of clauses 1-10, wherein the report of the relative position is sent using one of Uu Radio Resource Control (RRC) signaling, PC5-RRC signaling, or PC5-Signaling (S) signaling.

Clause 12. The method of any of clauses 1-11, wherein the report of the relative position is sent using application-layer signaling.

Clause 13. The method of clause 12, wherein the report of the relative position is sent in a groupcast or broadcast message.

Clause 14. The method of any of clauses 1-13, further comprising obtaining map information for one or more stationary reference points, wherein determining the relative position of the UE is based on the map information for the one or more stationary reference points.

Clause 15. The method of clause 14, wherein the map information for the one or more stationary reference points comprises at least one of road information, topographic information, or landmark information.

Clause 16. The method of any of clauses 1-15, further comprising receiving one or more messages from a network entity comprising position information for a moving reference point, wherein the relative position of the UE is with respect to the moving reference point and is determined based on the one or more messages.

Clause 17. The method of any of clauses 1-16, further comprising sending a message to a network entity indicating a positioning capability of the UE to determine at least one of a relative position, an absolute position, or an absolute and relative position of the UE.

Clause 18. The method of any of clauses 1-17, further comprising receiving a message from a network entity to configure the UE to report at least one of a relative position, an absolute position, or an absolute and relative position.

Clause 19. A user equipment (UE) configured for performing positioning, comprising: a wireless transceiver configured to wirelessly communicate with network entities; one or more sensors, at least one memory; and at least one processor coupled to the wireless transceiver, the one or more sensors, and the at least one memory, the at least one processor configured to: determine a relative position of the UE with respect to one or more reference points; and send, via the wireless transceiver, a report of the relative position to one or more vehicle On-Board Units (OBUs) in a wireless network, wherein the report further comprises an identification of the one or more reference points.

Clause 20. The UE of clause 19, wherein the report of the relative position further comprises a distance or distance vector with respect to the one or more reference points.

Clause 21. The UE of any of clauses 19-20, wherein the report of the relative position further comprises a heading of the UE and a placement of the UE with respect to one or more street elements.

Clause 22. The UE of any of clauses 19-21, wherein the one or more sensors comprise at least one of a radar sensor, a lidar sensor, an ultrasonic positioning sensor, or a camera sensor and the relative position is determined based on data from the one or more sensors.

Clause 23. The UE of any of clauses 19-22, wherein the relative position is determined based on wireless positioning.

Clause 24. The UE of clause 23, wherein at least one of the one or more reference points comprises a wireless transmitter and the report of the relative position further comprises a beam identifier of a beam received from the wireless transmitter.

Clause 25. The UE of any of clauses 19-24, wherein the one or more reference points comprise at least one of a stationary reference point and a moving reference point.

Clause 26. The UE of clause 25, wherein the moving reference point is associated with a vehicle OBU of the one or more vehicle OBUs.

Clause 27. The UE of any of clauses 19-26, wherein the identification of the one or more reference points comprises an absolute position of the one or more reference points.

Clause 28. The UE of any of clauses 19-27, the at least one processor is further configured to determine an absolute position of the UE, wherein the report further comprises the absolute position.

Clause 29. The UE of any of clauses 19-28, wherein the report of the relative position is sent using one of Uu Radio Resource Control (RRC) signaling, PC5-RRC signaling, or PC5-Signaling (S) signaling.

Clause 30. The UE of any of clauses 19-29, wherein the report of the relative position is sent using application-layer signaling.

Clause 31. The UE of clause 30, wherein the report of the relative position is sent in a groupcast or broadcast message.

Clause 32. The UE of any of clauses 19-31, the at least one processor is further configured to obtain map information for one or more stationary reference points, wherein determining the relative position of the UE is based on the map information for the one or more stationary reference points.

Clause 33. The UE of clause 32, wherein the map information for the one or more stationary reference points comprises at least one of road information, topographic information, or landmark information.

Clause 34. The UE of any of clauses 19-33, the at least one processor is further configured to receive, via the wireless transceiver, one or more messages from a network entity comprising position information for a moving reference point, wherein the relative position of the UE is with respect to the moving reference point and is determined based on the one or more messages.

Clause 35. The UE of any of clauses 19-34, the at least one processor is further configured to send, via the wireless transceiver, a message to a network entity indicating a positioning capability of the UE to determine at least one of a relative position, an absolute position, or an absolute and relative position of the UE.

Clause 36. The UE of any of clauses 19-35, the at least one processor is further configured to receive, via the wireless transceiver, a message from a network entity to configure the UE to report at least one of a relative position, an absolute position, or an absolute and relative position.

Clause 37. A user equipment (UE) configured for performing positioning, comprising: means for determining a relative position of the UE with respect to one or more reference points; and means for sending a report of the relative position to one or more vehicle On-Board Units (OBUs) in a wireless network, wherein the report further comprises an identification of the one or more reference points.

Clause 38. The UE of clause 37, wherein the report of the relative position further comprises a distance or distance vector with respect to the one or more reference points.

Clause 39. The UE of any of clauses 37-38, wherein the report of the relative position further comprises a heading of the UE and a placement of the UE with respect to one or more street elements.

Clause 40. The UE of any of clauses 37-39, wherein the relative position is determined based on one or more of radar, lidar, ultrasonic positioning, or camera.

Clause 41. The UE of any of clauses 37-40, wherein the relative position is determined based on wireless positioning.

Clause 42. The UE of clause 41, wherein at least one of the one or more reference points comprises a wireless transmitter and the report of the relative position further comprises a beam identifier of a beam received from the wireless transmitter.

Clause 43. The UE of any of clauses 37-42, wherein the one or more reference points comprise at least one of a stationary reference point and a moving reference point.

Clause 44. The UE of clause 43, wherein the moving reference point is associated with a vehicle OBU of the one or more vehicle OBUs.

Clause 45. The UE of any of clauses 37-44, wherein the identification of the one or more reference points comprises an absolute position of the one or more reference points.

Clause 46. The UE of any of clauses 37-45, further comprising means for determining an absolute position of the UE, wherein the report further comprises the absolute position.

Clause 47. The UE of any of clauses 37-46, wherein the report of the relative position is sent using one of Uu Radio Resource Control (RRC) signaling, PC5-RRC signaling, or PC5-Signaling (S) signaling.

Clause 48. The UE of any of clauses 37-47, wherein the report of the relative position is sent using application-layer signaling.

Clause 49. The UE of clause 48, wherein the report of the relative position is sent in a groupcast or broadcast message.

Clause 50. The UE of any of clauses 37-49, further comprising means for obtaining map information for one or more stationary reference points, wherein determining the relative position of the UE is based on the map information for the one or more stationary reference points.

Clause 51. The UE of clause 50, wherein the information for the one or more stationary reference points comprises at least one of road information, topographic information, or landmark information.

Clause 52. The UE of any of clauses 37-51, further comprising means for receiving one or more messages from a network entity comprising position information for a moving reference point, wherein the relative position of the UE is with respect to the moving reference point and is determined based on the one or more messages.

Clause 53. The UE of any of clauses 37-52, further comprising means for sending a message to a network entity indicating a positioning capability of the to determine at least one of a relative position, an absolute position, or an absolute and relative position of the UE.

Clause 54. The UE of any of clauses 37-53, further comprising means for receiving a message from a network entity to configure the UE to report at least one of a relative position, an absolute position, or an absolute and relative position.

Clause 55. A non-transitory storage medium including program code stored thereon, the program code is operable to configure at least one processor in a user equipment (UE) for performing positioning, the program code comprising instructions to: determine a relative position of the UE with respect to one or more reference points; and send a report of the relative position to one or more vehicle On-Board Units (OBUs) in a wireless network, wherein the report further comprises an identification of the one or more reference points.

Clause 56. The non-transitory storage medium of clause 55, wherein the report of the relative position further comprises a distance or distance vector with respect to the one or more reference points.

Clause 57. The non-transitory storage medium of any of clauses 55-56, wherein the report of the relative position further comprises a heading of the UE and a placement of the UE with respect to one or more street elements.

Clause 58. The non-transitory storage medium of any of clauses 55-57, wherein the relative position is determined based on one or more of radar, lidar, ultrasonic positioning, or camera.

Clause 59. The non-transitory storage medium of any of clauses 55-58, wherein the relative position is determined based on wireless positioning.

Clause 60. The non-transitory storage medium of clause 59, wherein at least one of the one or more reference points comprises a wireless transmitter and the report of the relative position further comprises a beam identifier of a beam received from the wireless transmitter.

Clause 61. The non-transitory storage medium of any of clauses 55-60, wherein the one or more reference points comprise at least one of a stationary reference point and a moving reference point.

Clause 62. The non-transitory storage medium of clause 61, wherein the moving reference point is associated with a vehicle OBU of the one or more vehicle OBUs.

Clause 63. The non-transitory storage medium of any of clauses 55-62, wherein the identification of the one or more reference points comprises an absolute position of the one or more reference points.

Clause 64. The non-transitory storage medium of any of clauses 55-63, the program code further comprises instructions to determine an absolute position of the UE, wherein the report further comprises the absolute position.

Clause 65. The non-transitory storage medium of any of clauses 55-64, wherein the report of the relative position is sent using one of Uu Radio Resource Control (RRC) signaling, PC5-RRC signaling, or PC5-Signaling (S) signaling.

Clause 66. The non-transitory storage medium of any of clauses 55-65, wherein the report of the relative position is sent using application-layer signaling.

Clause 67. The non-transitory storage medium of clause 66, wherein the report of the relative position is sent in a groupcast or broadcast message.

Clause 68. The non-transitory storage medium of any of clauses 55-67, program code further comprises instructions to obtain map information for one or more stationary reference points, wherein determining the relative position of the UE is based on the map information for the one or more stationary reference points.

Clause 69. The non-transitory storage medium of clause 68, wherein the information for the one or more stationary reference points comprises at least one of road information, topographic information, or landmark information.

Clause 70. The non-transitory storage medium of any of clauses 55-69, program code further comprises instructions to receive one or more messages from a network entity comprising position information for a moving reference point, wherein the relative position of the UE is with respect to the moving reference point and is determined based on the one or more messages.

Clause 71. The non-transitory storage medium of any of clauses 55-70, program code further comprises instructions to send a message to a network entity indicating a positioning capability of the UE to determine at least one of a relative position, an absolute position, or an absolute and relative position of the UE.

Clause 72. The non-transitory storage medium of any of clauses 55-71, program code further comprises instructions to receive a message from a network entity to configure the UE to report at least one of a relative position, an absolute position, or an absolute and relative position.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE), the method comprising:
   determining a relative position of the UE with respect to one or more reference points;
   receiving a message from a network entity to configure the UE to report the relative position; and
   reporting the relative position to one or more vehicle On-Board Units (OBUs) in a wireless network, the reporting comprising an identification of the one or more reference points.

2. The method of claim 1, wherein the reporting further comprises a distance or distance vector with respect to the one or more reference points.

3. The method of claim 1, wherein the reporting further comprises a heading of the UE and a placement of the UE with respect to one or more street elements.

4. The method of claim 1, wherein the relative position is determined based on one or more of radar, lidar, ultrasonic positioning, or camera.

5. The method of claim 1, wherein the relative position is determined based on wireless positioning.

6. The method of claim 1, wherein the one or more reference points comprise at least one of a stationary reference point and a moving reference point.

7. The method of claim 1, wherein the identification of the one or more reference points comprises an absolute position of the one or more reference points.

8. The method of claim 1, the method further comprising determining an absolute position of the UE, the reporting further comprising the absolute position.

9. The method of claim 1, wherein the reporting is performed using one of Uu Radio Resource Control (RRC) signaling, PC5-RRC signaling, or PC5-Signaling(S) signaling.

10. The method of claim 1, wherein the reporting is performed using application-layer signaling.

11. The method of claim 1, further comprising obtaining map information for one or more stationary reference points, wherein determining the relative position of the UE is based on the map information for the one or more stationary reference points.

12. The method of claim 1, further comprising receiving one or more messages from a network entity comprising position information for a moving reference point, wherein the relative position of the UE is with respect to the moving reference point and is determined based on the one or more messages.

13. The method of claim 1, further comprising sending a message to a network entity indicating a positioning capability of the UE to determine at least one of a relative position, an absolute position, or an absolute and relative position of the UE.

14. The method of claim 3, wherein the one or more street elements comprise one or more of a sidewalk, a curb or curb extension, a bike lane, a crosswalk, a corner, a crossing or intersection, a truck apron or pillow, a bus bulb, a crossing island, a traffic circle, or a road or lane.

15. A user equipment (UE) comprising:
   a wireless transceiver configured to wirelessly communicate with network entities;
   one or more sensors,
   at least one memory; and
   at least one processor coupled to the wireless transceiver, the one or more sensors, and the at least one memory, the at least one processor configured to:
      determine a relative position of the UE with respect to one or more reference points;
      receive a message from a network entity to configure the UE to report the relative position; and
      report the relative position to one or more vehicle On-Board Units (OBUs) in a wireless network, the report comprising an identification of the one or more reference points.

16. The UE of claim 15, wherein the report further comprises a distance or distance vector with respect to the one or more reference points.

17. The UE of claim 15, wherein the report further comprises a heading of the UE and a placement of the UE with respect to one or more street elements.

18. The UE of claim 15, wherein the one or more sensors comprise at least one of a radar sensor, a lidar sensor, an ultrasonic positioning sensor, or a camera sensor and the relative position is determined based on data from the one or more sensors.

19. The UE of claim 15, wherein the relative position is determined based on wireless positioning.

20. The UE of claim 15, wherein the one or more reference points comprise at least one of a stationary reference point and a moving reference point.

21. The UE of claim 15, wherein the identification of the one or more reference points comprises an absolute position of the one or more reference points.

22. The UE of claim 15, the at least one processor is further configured to determine an absolute position of the UE, the report further comprising the absolute position.

23. The UE of claim 15, wherein the report is sent to the one or more vehicle OBUs using one of Uu Radio Resource Control (RRC) signaling, PC5-RRC signaling, or PC5-Signaling(S) signaling.

24. The UE of claim 15, wherein the report is sent to the one or more vehicle OBUs using application-layer signaling.

25. The UE of claim 15, the at least one processor is further configured to obtain map information for one or more stationary reference points, wherein determining the relative position of the UE is based on the map information for the one or more stationary reference points.

26. The UE of claim 15, the at least one processor is further configured to receive, via the wireless transceiver, one or more messages from a network entity comprising position information for a moving reference point, wherein the relative position of the UE is with respect to the moving reference point and is determined based on the one or more messages.

27. The UE of claim 15, the at least one processor is further configured to send, via the wireless transceiver, a message to a network entity indicating a positioning capability of the UE to determine at least one of a relative position, an absolute position, or an absolute and relative position of the UE.

28. The UE of claim 17, wherein the one or more street elements comprise one or more of a sidewalk, a curb or curb extension, a bike lane, a crosswalk, a corner, a crossing or intersection, a truck apron or pillow, a bus bulb, a crossing island, a traffic circle, or a road or lane.

29. A user equipment (UE) comprising:
   means for determining a relative position of the UE with respect to one or more reference points;
   means for receiving a message from a network entity to configure the UE to report the relative position; and
   means for reporting the relative position to one or more vehicle On-Board Units (OBUs) in a wireless network, the reporting further comprising an identification of the one or more reference points.

30. A non-transitory storage medium including program code stored thereon, the program code is operable to configure at least one processor in a user equipment (UE), the program code comprising instructions to:
  determine a relative position of the UE with respect to one or more reference points;
  receive a message from a network entity to configure the UE to report the relative position; and
  send a report of the relative position to one or more vehicle On-Board Units (OBUs) in a wireless network, wherein the report further comprises an identification of the one or more reference points.

* * * * *